(12) United States Patent
Fujinaka et al.

(10) Patent No.: US 11,512,373 B2
(45) Date of Patent: Nov. 29, 2022

(54) HOT-STAMPING FORMED BODY

(71) Applicant: NIPPON STEEL CORPORATION, Tokyo (JP)

(72) Inventors: Shingo Fujinaka, Tokyo (JP); Yuri Toda, Tokyo (JP); Daisuke Maeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/424,119

(22) PCT Filed: Mar. 19, 2020

(86) PCT No.: PCT/JP2020/012343
§ 371 (c)(1),
(2) Date: Jul. 19, 2021

(87) PCT Pub. No.: WO2020/189761
PCT Pub. Date: Sep. 24, 2020

(65) Prior Publication Data
US 2022/0127705 A1 Apr. 28, 2022

(30) Foreign Application Priority Data

Mar. 20, 2019 (JP) .............................. JP2019-052104

(51) Int. Cl.
*C22C 38/00* (2006.01)
*B32B 15/01* (2006.01)
*C22C 38/32* (2006.01)
*B21D 22/02* (2006.01)
*C21D 6/00* (2006.01)
(Continued)

(52) U.S. Cl.
CPC ............ *C22C 38/32* (2013.01); *B21D 22/022* (2013.01); *B32B 15/01* (2013.01); *C21D 6/002* (2013.01); *C21D 6/005* (2013.01); *C21D 6/007* (2013.01); *C21D 6/008* (2013.01); *C21D 8/005* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/26* (2013.01);
(Continued)

(58) Field of Classification Search
None
See application file for complete search history.

(56) References Cited

U.S. PATENT DOCUMENTS

| 2018/0030567 | A1* | 2/2018 | Yi ........................... C22C 38/22 |
| 2019/0048446 | A1* | 2/2019 | Arai ........................ C22C 38/24 |
| 2019/0390295 | A1* | 12/2019 | Nakagawa ........... B21D 22/022 |

FOREIGN PATENT DOCUMENTS

| JP | 5177119 B2 | 4/2013 |
| WO | WO 2015/194571 A1 | 12/2015 |

(Continued)

*Primary Examiner* — Mary I Omori
(74) *Attorney, Agent, or Firm* — Birch, Stewart, Kolasch & Birch, LLP

(57) ABSTRACT

A hot-stamping formed body has a predetermined chemical composition and a microstructure including, by area ratio, 90% to 100% of martensite and 0% to 10% of a remainder in the microstructure. In the microstructure, a region in which an average GAIQ value in a unit grain is 60,000 or more is 30 area % or more, and a number density of carbides having a circle equivalent diameter of 0.20 µm or more is 50/mm$^2$ or less.

8 Claims, 4 Drawing Sheets

(51) Int. Cl.
*C21D 8/00* (2006.01)
*C22C 38/02* (2006.01)
*C22C 38/04* (2006.01)
*C22C 38/06* (2006.01)
*C22C 38/22* (2006.01)
*C22C 38/26* (2006.01)
*C22C 38/28* (2006.01)
*C22C 38/30* (2006.01)

(52) U.S. Cl.
CPC .............. *C22C 38/28* (2013.01); *C22C 38/30* (2013.01); *C21D 2211/008* (2013.01)

(56) References Cited

FOREIGN PATENT DOCUMENTS

| | | | | |
|---|---|---|---|---|
| WO | WO-2017150252 A1 | * | 9/2017 | ............... B32B 1/08 |
| WO | WO-2018179839 A1 | * | 10/2018 | ........... B21D 22/022 |

* cited by examiner

HOT-STAMPING FORMED BODY

TECHNICAL FIELD OF THE INVENTION

The present invention relates to a hot-stamping formed body.

Priority is claimed on Japanese Patent Application No. 2019-052104, filed Mar. 20, 2019, the content of which is incorporated herein by reference.

BACKGROUND ART

In recent years, vehicle collision safety standards are being tightened, and vehicle members are required to have improved collision performance. For an improvement in collision performance, there are a deformation suppressing member for maintaining the shape as a member without being deformed even when subjected to an impact, and an impact absorbing member for absorbing collision energy by bending deformation. The deformation suppressing member is required to have high strength (specifically, a tensile strength of 1,800 MPa or more) and excellent toughness. The impact absorbing member is required to have a certain degree of high strength (specifically, a tensile strength of 1,500 MPa or more) and excellent bendability.

Patent Document 1 discloses inventions relating to a steel sheet for hot pressing which contains 0.8% to 2.0% of Cr by mass %, has a carbon equivalent Ceq of 0.43% to 0.7%, and has a martensitic transformation start temperature (Ms point) of 415° C. or higher, a hot press-formed article, and a method of manufacturing the same. In Patent Document 1, it is disclosed that a hot press-formed article having excellent ductility and a tensile strength of 1,500 MPa or more is obtained by setting an average cooling rate from the start of press forming to the Ms point to 20° C./s or more to obtain a metallographic structure primarily containing martensite and thereafter setting an average cooling rate at a temperature lower the Ms point is 0.1 to 300° C./s to obtain a metallographic structure in which carbides are finely dispersed.

Patent Document 2 discloses a hot stamping member having a tensile strength of 1,800 MPa or more, in which a prior austenite grain size is controlled to 10 μm or less by performing cooling in a temperature range from an Ms point to 150° C. after hot pressing at an average cooling rate of 10 to 500° C./s, and furthermore, toughness is improved by auto-tempering of martensite.

PRIOR ART DOCUMENT

Patent Document

[Patent Document 1] PCT International Publication No. WO2015/194571
[Patent Document 2] Japanese Patent No. 5177119

DISCLOSURE OF THE INVENTION

Problems to be Solved by the Invention

The steel sheet for hot pressing described in Patent Document 1 contains 0.8% to 2.0% Cr. However, Cr lowers the Ms point, and is thus an element that suppresses auto-tempering in a cooling process during hot-stamping forming. In addition, since Cr is also a carbide stabilizing element, Cr delays the dissolution of carbides in heating during the hot-stamping forming and thus deteriorates the bendability and toughness of the formed article. Therefore, there are cases where the hot press-formed article described in Patent Document 1 does not have sufficient bendability.

In a steel sheet for hot pressing described in Patent Document 2, cooling is performed in the temperature range from the Ms point to 150° C. at an average cooling rate of 10 to 500° C./s, and Co is not contained. Therefore, the Ms point is low, the proportion of auto-tempered grains in the formed article cannot be sufficiently secured, and there are cases where the bendability is not sufficient.

The present invention has been made to solve the above problems of the related art. An object of the present invention is to provide a hot-stamping formed body having high strength and excellent bendability.

Means for Solving the Problem

As a result of intensive examinations on a method for solving the above problems, the present inventors have obtained the following findings.

In order to improve the bendability of the hot-stamping formed body, first, it is important to reduce the Mn content, suppress the microsegregation of Mn, and reduce the origin of a crack. However, hardenability is lowered when the Mn content is reduced. Therefore, it is necessary to secure the hardenability by including Mo as an essential element.

Auto-tempering is a phenomenon in which grains that have completed martensitic transformation are tempered in order. Therefore, the martensite grains generated by transformation in a low temperature range are less likely to be tempered. In addition, martensite generated by transformation in a low temperature range is hard and brittle. Therefore, by sufficiently tempering the martensite generated by transformation in a low temperature range, an improvement margin of mechanical properties increases.

Therefore, in order to improve the bendability of the hot-stamping formed body, second, it is important to raise an Ms point by appropriately adjust the chemical composition. Accordingly, the start time of martensitic transformation is advanced, and it becomes easy to secure the proportion of auto-tempered grains.

Third, it is important to promote auto-tempering by lowering a cooling rate in a relatively low temperature range of the Ms point or lower during hot-stamping forming, and to temper martensite that has been generated by transformation in a low temperature range and is thus hard and brittle.

The present invention has been made based on the above findings, and the gist thereof is the following hot-stamping formed body.

[1] A hot-stamping formed body according to an aspect of the present invention includes, as a chemical composition, by mass %:
C: 0.20% or more and less than 0.70%;
Si: 0.010% to 1.30%;
Mn: less than 0.50%;
P: 0.100% or less;
S: 0.0100% or less;
sol. Al: 0.0010% to 0.500%;
N: 0.0100% or less;
Ti: 0.010% to 0.100%;
Cr: 0.010% to 0.80%;
B: 0.0005% to 0.0100%;
Mo: 0.10% to 1.00%;
Co: 0.10% to 4.00%;
Nb: 0% to 0.100%;
V: 0% to 0.100%;
Ni: 0% to 0.50%;

REM: 0% to 0.0100%;
Mg: 0% to 0.0100%;
Ca: 0% to 0.0100%; and
a remainder consisting of Fe and impurities,
in which a microstructure of the hot-stamping formed body includes, by area ratio, 90% to 100% of martensite and 0% to 10% of a remainder in the microstructure,
in the microstructure,
a region in which an average GAIQ value in a unit grain is 60,000 or more is 30 area % or more, and
a number density of carbides having a circle equivalent diameter of 0.20 μm or more is 50/mm$^2$ or less.

[2] The hot-stamping formed body according to [1] may include, as the chemical composition, by mass %, one or two or more elements selected from the group consisting of:
Nb: 0.010% to 0.100%;
V: 0.001% to 0.100%;
Ni: 0.001% to 0.50%:
REM: 0.0010% to 0.0100%;
Mg: 0.0010% or more and 0.0100% or less; and
Ca: 0.0010% to 0.0100%.

[3] The hot-stamping formed body according to [1] or [2] may further include: a plating layer on a surface layer of the hot-stamping formed body.

[4] In the hot-stamping formed body according to any one of [1] to [3], a portion of the hot-stamping formed body may have a softened region.

Effects of the Invention

According to the above aspect according to the present invention, it is possible to provide a hot-stamping formed body having high strength and excellent bendability.

EMBODIMENTS OF THE INVENTION

Figure 1:
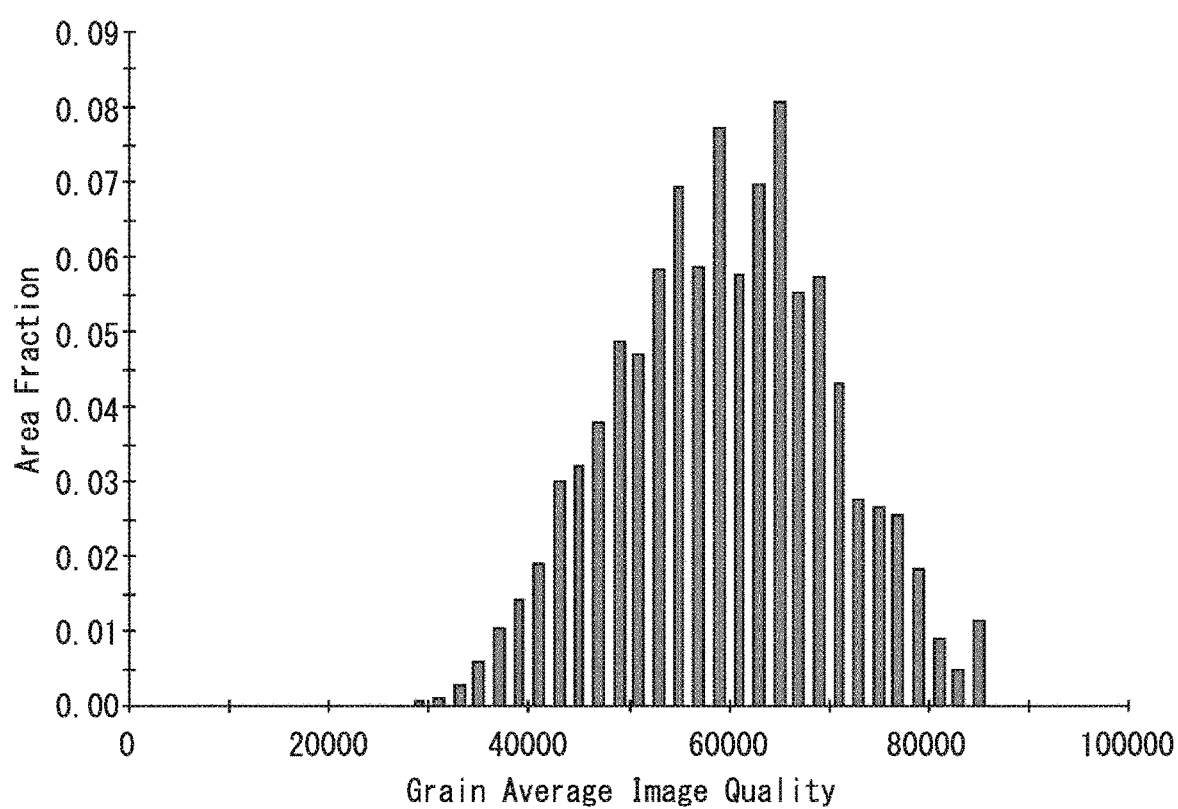
FIG. 1 is a diagram showing a distribution (histogram) of GAIQ values of a test piece in which auto-tempered grains and grains that are not auto-tempered are mixed.

Hereinafter, a hot-stamping formed body according to the present embodiment and a method of manufacturing the same will be described in detail. However, the present invention is not limited to the configuration disclosed in the present embodiment, and various modifications can be made without departing from the gist of the present invention.

<Chemical Composition of Hot-Stamping Formed Body>

First, the reason for limiting the chemical composition of the hot-stamping formed body according to the present embodiment will be described. Hereinafter, all % regarding the chemical composition means mass %. Numerical values indicated as "more than or equal to" or "less than or equal to" fall within the numerical range. Numerical values indicated as "less than" or "more than" do not fall within the numerical range.

The hot-stamping formed body according to the present embodiment includes, as a chemical composition, by mass %: C: 0.20% or more and less than 0.70%; Si: 0.010% to 1.30%; Mn: less than 0.50%; P: 0.100% or less; S: 0.0100% or less; sol. Al: 0.0010% to 0.500%; N: 0.0100% or less; Ti: 0.010% to 0.100%; Cr: 0.010% to 0.80%; B: 0.0005% to 0.0100%: Mo: 0.10% to 1.00%; Co: 0.10% to 4.00%; and a remainder consisting of Fe and impurities. Hereinafter, each element will be described.

"C: 0.20% or More and Less than 0.70%"

C is an important element for obtaining a tensile strength of 1,500 MPa or more in the hot-stamping formed body. When the C content is less than 0.20%, martensite is soft and it is difficult to secure a tensile strength of 1,500 MPa or more. Therefore, the C content is set to 0.20% or more. The C content is preferably 0.21% or more and 0.22% or more. On the other hand, when the C content is 0.70% or more, coarse carbides are generated, and these carbides serve as bending crack origins. As a result, the bendability of the hot-stamping formed body decreases. For this reason, the C content is set to less than 0.70%. The C content is preferably 0.60% or less, 0.55% or less, and 0.50% or less.

"Si: 0.010% to 1.30%"

Si has an effect of suppressing the formation of coarse cementite, which serves as a bending crack origin, and is an important element for securing the bendability of the hot-stamping formed body. In addition, Si has resistance to temper softening, and has an action of suppressing a decrease in strength due to self-tempering during hot stamping hardening. When the Si content is less than 0.010%, the above effect cannot be obtained, and there are cases where the bendability of the hot-stamping formed body deteriorates. Therefore, the Si content is set to 0.010% or more. The Si content is preferably 0.20% or more, and 0.25% or more. On the other hand, when Si is contained in an amount of more than 1.30%, an $Ac_3$ point rises, and there are cases where an austenite single phase is not formed during hot-stamping heating. As a result, the microstructure of the hot-stamping formed body becomes an inhomogeneous structure, and the bendability deteriorates. Therefore, the Si content is set to 1.30% or less. The Si content is preferably 1.10% or less, 0.80% or less, and 0.60% or less.

"Mn: Less than 0.50%"

Mn is an element that contributes to an improvement in the strength of the hot-stamping formed body by solid solution strengthening. However, Mn tends to be a crack origin due to microsegregation, which deteriorates the bendability of the hot-stamping formed body. Therefore, the Mn content needs to be reduced as much as possible and is set to less than 0.50%. The Mn content is preferably 0.45% or less. The Mn content is preferably as low as possible, but is preferably set to 0.001% or more in order to suppress intergranular embrittlement due to the formation of Fe-based sulfides. The Mn content is more preferably 0.20% or more, and 0.24% or more.

"P: 0.100% or Less"

P is an element that segregates to the grain boundaries and reduces intergranular strength. When the P content exceeds 0.100%, the intergranular strength significantly decreases, and the bendability of the hot-stamping formed body decreases. Therefore, the P content is set to 0.100% or less. The P content is preferably 0.050% or less, 0.030% or less, and 0.020% or less. The lower limit of the P content is not particularly limited. However, when the P content is reduced to less than 0.0001%, the dephosphorization cost is increased significantly, which is economically unfavorable. In an actual operation, the P content may be set to 0.0001% or more, and 0.001% or more.

"S: 0.0100% or Less"

S is an element that forms inclusions in the steel. When the S content exceeds 0.0100%, a large amount of inclusions, which serve as bending crack origins, are generated in the steel, and the bendability of the hot-stamping formed body decreases. Therefore, the S content is set to 0.0100% or less. The S content is preferably 0.0040% or less, and 0.0030% or less. The lower limit of the S content is not particularly limited. However, when the S content is reduced to less than 0.00015%, the desulfurization cost is increased significantly, which is economically unfavorable. In an actual operation, the S content may be set to 0.00015% or more, and 0.0002% or more.

"Sol. Al: 0.0010% to 0.500%"

Al is an element having an action of deoxidizing molten steel and achieving soundness of the steel (suppressing the occurrence of defects such as blowholes in the steel). When the sol. Al content is less than 0.0010%, deoxidation does not sufficiently proceed. Therefore, the sol. Al content is set to 0.0010% or more. The sol. Al content is preferably 0.010% or more, 0.015% or more, and 0.020% or more. On the other hand, when the sol. Al content exceeds 0.500%, coarse oxides, which serve as bending crack origins, are generated in the steel, and the bendability of the hot-stamping formed body decreases. Therefore, the sol. Al content is set to 0.500% or less. The sol. Al content is preferably 0.400% or less, 0.350% or less, and 0.200% or less.

In the present embodiment, sol. Al means acid-soluble Al, and indicates solute Al present in the steel in a solid solution state.

"N: 0.0100% or Less"

N is an impurity element that forms nitrides, which serve as bending crack origins, in the steel and is an element that deteriorates the bendability of the hot-stamping formed body. When the N content exceeds 0.0100%, coarse nitrides are generated in the steel, and the bendability of the hot-stamping formed body significantly decreases. Therefore, the N content is set to 0.0100% or less. The N content is preferably 0.0075% or less, 0.0050% or less, and 0.0040% or less. The lower limit of the N content is not particularly limited. However, when the N content is reduced to less than 0.0001%, the denitrification cost is increased significantly, which is economically unfavorable. In an actual operation, the N content may be set to 0.0001% or more, 0.0005% or more, and 0.0010% or more.

"Ti: 0.010% to 0.100%"

Ti is an important element for securing the amount of solute B required for securing hardenability by forming carbonitrides, consuming solute nitrogen, and suppressing the formation of BN. When the Ti content is less than 0.010%, the above effect cannot be obtained, the hardenability is insufficient, and an inhomogeneous structure is formed, so that the bendability of the hot-stamping formed body deteriorates. Therefore, the Ti content is set to 0.010% or more. The Ti content is preferably 0.015% or more, 0.020% or more, and 0.025% or more. On the other hand, when Ti is contained in an amount of more than 0.100%, coarse TiN, which serves as a bending crack origin, is generated, so that the bendability of the hot-stamping formed body deteriorates. Therefore, the Ti content is set to 0.100% or less. The Ti content is preferably 0.080% or less, 0.060% or less, and 0.040% or less.

"Cr: 0.010% to 0.80%"

Since Cr is an element that refines carbides to improve bendability, Cr is contained in a certain amount in a hot-stamping formed body in the related art. However, Cr lowers the Ms point and is thus an element that suppresses auto-tempering in a cooling process during hot-stamping forming. In addition, since Cr is also a carbide stabilizing element, Cr delays the dissolution of carbides in heating during the hot-stamping forming and thus deteriorates the bendability of the hot-stamping formed body. Therefore, in the present embodiment, the Cr content is set to 0.80% or less. The Cr content is more preferably 0.60% or less, and 0.40% or less. On the other hand, when the Cr content is too small, carbides become coarse. Therefore, the Cr content is set to 0.010% or more. The Cr content is preferably 0.02% or more, and 0.05% or more.

"B: 0.0005% to 0.0100%"

B is an element that segregates to the grain boundaries and enhances the hardenability of the steel. When the B content is less than 0.0005%, the above effect cannot be obtained, and there are cases where ferrite is formed. As a result, there are cases where it is difficult to obtain a tensile strength of 1,500 MPa or more, and cases where an inhomogeneous structure is formed, and the bendability deteriorates. Therefore, the B content is set to 0.0005% or more. The B content is preferably 0.0010% or more and 0.0015% or more. On the other hand, When B is contained in an amount of more than 0.0100%, coarse BN, which serves as a bending crack origin, is formed, and the bendability of the hot-stamping formed body deteriorates. Therefore, the B content is set to 0.0100% or less. The B content is preferably 0.0075% or less, 0.0050% or less, and 0.0040% or less.

"Mo: 0.10% to 1.00%"

Mo is an element that improves the strength of the hot-stamping formed body by solid solution strengthening and increase the hardenability of the steel, thereby suppressing the formation of ferrite that deteriorates the bendability. In the present embodiment, one feature is to reduce the Mn content. Therefore, Mo is an essential element. In order to exhibit the above effect, the Mo content is set to 0.10% or more. The Mo content is preferably 0.15% or more, and 0.20% or more. On the other hand, even if Mo is contained in an amount of more than 1.00%, not only is the above effect saturated, but also an increase in the alloy cost is incurred. Therefore, the Mo content is set to 1.00% or less. The Mo content is preferably 0.80% or less, 0.60% or less, 0.50% or less, and 0.40% or less.

"Co: 0.10% to 4.00%"

Co is an element having an action of raising a martensite start temperature (Ms point) and is an essential element for improving the bendability of the hot-stamping formed body. In order to exhibit the above effect, the Co content is set to 0.10% or more. The Co content is preferably 0.15% or more, and 0.20% or more. On the other hand, when the Co content exceeds 4.00%, the hardenability of the steel decreases, and it becomes difficult to secure a tensile strength of 1,500 MPa or more. Therefore, the Co content is set to 4.00% or less. The Co content is preferably 3.00% or less, 2.00% or less, and 1.00% or less.

The remainder of the chemical composition of the hot-stamping formed body according to the present embodiment consists of Fe and impurities. The impurities are elements unavoidably incorporated from steel raw materials or scrap, elements unavoidably incorporated in a steelmaking process, and/or elements intentionally added in a small amount, and examples thereof are elements that are allowed in a range in which the characteristics of the hot-stamping formed body according to the present embodiment are not inhibited.

In the hot-stamping formed body according to the present embodiment, the following optional elements may be contained instead of a portion of Fe. The lower limit of the amounts of the optional elements in a case where the following optional elements are not contained is 0%. Hereinafter, each optional element will be described in detail.

"Nb: 0% to 0.100%"

Nb is an element that improves the strength of the hot-stamping formed body by solid solution strengthening and forms carbonitrides, thereby contributing to grain refinement of the prior austenite grains. Therefore, Nb may be contained as necessary. In order to reliably exhibit the above effect, the Nb content is preferably set to 0.010% or more. The Nb content is more preferably 0.035% or more. On the other hand, when Nb is contained in an amount of more than 0.100%, coarse carbonitrides, which serve as bending crack origins, are excessively generated, and there are cases where the bendability of the hot-stamping formed body decreases. Therefore, the Nb content is set to 0.100% or less. The Nb content is preferably 0.080% or less.

"V: 0% to 0.100%"

V is an element that improves the strength of the hot-stamping formed body by solid solution strengthening and thus may be contained as necessary. In order to obtain the above effect, the V content is preferably set to 0.001% or more. The V content is more preferably 0.050% or more. On the other hand, when the V content exceeds 0.100%, coarse carbonitrides, which serve as bending crack origins, are excessively generated, and the bendability of the hot-stamping formed body decreases. Therefore, the V content is set to 0.100% or less. The V content is preferably 0.050% or less.

"Ni: 0% to 0.50%"

Ni is an element that dissolves in austenite, enhances the hardenability of the steel, and is thus effective in stably securing a tensile strength of 1,500 MPa or more. Therefore, Ni may be contained as necessary. In order to obtain the above effect, the Ni content is preferably set to 0.001% or more. The Ni content is more preferably 0.01% or more. On the other hand, even if Ni is contained in an amount of more than 0.50%, the above effect is saturated, and an increase in the alloy cost is incurred. Therefore, the Ni content is set to 0.50% or less. The Ni content is preferably 0.40% or less.

"REM: 0% to 0.0100%"

REM is an element having an action of deoxidizing molten steel and achieving soundness of the steel, and improves the bendability of the hot-stamping formed body. Therefore, REM may be contained as necessary. In order to obtain the above effect, the REM content is preferably set to 0.0010% or more. On the other hand, even if REM is contained in an amount of more than 0.0100%, the above effect is saturated, and an increase in the cost is incurred. Therefore, the REM content is set to 0.0100% or less. The REM content is preferably 0.0080% or less.

In the present embodiment, REM refers to a total of 17 elements including Sc, Y, and lanthanoids. In the present embodiment, the REM content refers to the total amount of these elements. Lanthanoids are added in the form of mischmetal in industry.

"Mg: 0% to 0.0100%"

Mg is an element having an action of deoxidizing molten steel and achieving soundness of the steel, and improves the bendability of the hot-stamping formed body. Therefore, Mg may be contained as necessary. In order to obtain the above effect, the Mg content is preferably set to 0.0010% or more. On the other hand, even if Mg is contained in an amount of more than 0.0100%, the above effect is saturated, and an increase in the cost is incurred. Therefore, the Mg content is set to 0.0100% or less. The Mg content is preferably 0.0080% or less.

"Ca: 0% to 0.0100%"

Ca is an element having an action of deoxidizing molten steel and achieving soundness of the steel, and improves the bendability of the hot-stamping formed body. Therefore, Ca may be contained as necessary. In order to obtain the above effect, the Ca content is preferably set to 0.0010% or more. On the other hand, even if Ca is contained in an amount of more than 0.0100%, the above effect is saturated, and an increase in the cost is incurred. Therefore, the Ca content is set to 0.0100% or less. The Ca content is preferably 0.0080% or less.

The chemical composition of the hot-stamping formed body described above may be measured by a general analytical method. For example, the chemical composition may be measured using inductively coupled plasma-atomic emission spectrometry (ICP-AES). In addition, sol. Al may be measured by ICP-AES using a filtrate obtained by heating and decomposing a sample with an acid. C and S may be measured using a combustion-infrared absorption method, and N may be measured using an inert gas fusion-thermal conductivity method.

In the present embodiment, by raising the Ms point, the temperature range in which martensite grains are auto-tempered is expanded, thereby increasing the proportion of the auto-tempered martensite grains. Here, the Ms point can be obtained by Expression (A). The Ms point obtained by Expression (A) is preferably 250° C. or higher, more preferably 290° C. or higher, and more preferably 350° C. or higher.

The Ms point is preferably set to 550° C. or lower in order to suppress deterioration of the bendability of the hot-stamping formed body due to the coarsening of carbides caused by excessive promotion of the auto-tempering. The Ms point is more preferably 500° C. or lower.

It is preferable to control the chemical composition of the hot-stamping formed body so that the Ms point becomes the above-mentioned value.

$$Ms = 550 - 361 \times C - 39 \times Mn - 35 \times V - 20 \times Cr - 17 \times Ni - 5 \times Mo + 15 \times Co + 30 \times sol.\ Al \quad \text{Expression (A)}$$

Here, the element symbol in Expression (A) indicates the amount of the corresponding element by mass %, and 0 is substituted in a case where the corresponding element is not contained.

<Microstructure of Hot-Stamping Formed Body>

Next, the microstructure of the hot-stamping formed body according to the present embodiment will be described.

In the hot-stamping formed body according to the present embodiment, the microstructure includes, by area ratio, 90% to 100% of martensite and 0% to 10% of a remainder in the microstructure, in the microstructure, a region in which an average GAIQ value in a unit grain is 60,000 or more is 30 area % or more, and a number density of carbides having a circle equivalent diameter of 0.20 µm or more is 50/mm² or less.

"90% to 100% of Martensite by Area Ratio"

The microstructure of the hot-stamping formed body according to the present embodiment primarily includes martensite (90% or more by area ratio). In the present embodiment, the martensite includes fresh martensite (martensite that has not been auto-tempered) and tempered martensite (auto-tempered martensite). The area ratio of martensite is set to 90% or more. The area ratio of martensite is preferably 93% or more, 95% or more, and 97% or more. The upper limit of the area ratio of martensite is 100%.

"0% to 10% of Remainder in Microstructure by Area Ratio"

The remainder in the microstructure other than martensite is not particularly limited, and examples of the remainder in the microstructure include ferrite, pearlite, upper bainite, lower bainite, and residual austenite. In addition, the remainder in the microstructure may contain iron carbides and the like. The area ratio of the remainder in the microstructure is set to 0% to 10% in relation to the area ratio of martensite. The area ratio of the remainder in the microstructure is preferably 7% or less, 5% or less, and 3% or less.

(Method of Measuring Area Ratio of Martensite)

The area ratio of martensite is measured by the following method.

A sample is taken from a position 50 mm or more away from the end surface of the hot-stamping formed body (or a position avoiding the end portion) so that the sheet thickness cross section can be observed. After polishing the observed section, nital etching is performed to clarify the contrast between carbides and grain boundaries. Next, using a field-emission scanning electron microscope (FE-SEM) equipped with a secondary electron detector, a secondary electron image of a region centered on a t/4 thickness position of the sample (a region from a ⅛ thickness depth from the surface to a ⅜ thickness depth from the surface) is photographed at a photographing magnification of 5,000-fold.

In the photograph obtained by the above method, phases other than martensite (ferrite, pearlite, upper bainite, lower bainite, residual austenite, and the like) and martensite (fresh martensite and tempered martensite) are distinguished from each other. Upper bainite, lower bainite, and tempered martensite can be distinguished by the presence or absence of iron carbides in the lath-like grains and the stretching direction of the iron carbides. Fresh martensite is not sufficiently etched by nital etching and is therefore distinguishable from other etched structures. However, since residual austenite is not sufficiently etched like martensite, the area ratio of fresh martensite is obtained by obtaining the difference from the area ratio of residual austenite obtained by a method described later.

Upper bainite is a phase formed of aggregates of lath-like grains, and is accompanied by precipitation of carbides between laths.

Lower bainite and tempered martensite are also phases formed of aggregates of lath-like grains, but are phases containing carbides inside the laths. Lower bainite and tempered martensite are distinguished from each other by the stretching direction of carbides. The carbides of lower bainite have a single variant, have an angular difference of 5° or less between carbides present in a single grain, and thus have substantially a single direction. On the other hand, the carbides of tempered martensite have a plurality of variants, and the carbides present in a single grain are stretched in a plurality of directions. By the difference, lower bainite and tempered martensite are distinguished from each other.

The area ratio of residual austenite is measured in the same region as the observed region from which the photograph is obtained. The observed section is polished using #600 to #1500 silicon carbide paper and thereafter mirror-finished using a liquid obtained by dispersing a diamond powder having a particle size of 1 to 6 µm in a diluted solution such as alcohol or pure water. Next, the observed section is polished at room temperature using colloidal silica containing no alkaline solution for 8 minutes to remove strain introduced into the surface layer of the observed section. The observed section is measured by an electron backscatter diffraction method at a measurement interval of 0.1 µm to obtain crystal orientation information. For the measurement, an apparatus including a thermal field-emission scanning electron microscope (JSM-7001F manufactured by JEOL Ltd.) and an EBSD detector (DVC5 type detector manufactured by TSL) is used. At this time, the degree of vacuum in the apparatus is set to $9.6 \times 10^{-3}$ Pa or less, the acceleration voltage is set to 15 kV, the irradiation current level is set to 13, and the electron beam irradiation level is set to 62. The area ratio of residual austenite, which is an fcc structure, is calculated from the obtained crystal orientation information using the "Phase Map" function installed in the software "OIM Analysis (registered trademark)" attached to the EBSD analyzer, thereby obtaining the area ratio of residual austenite.

By distinguishing the structures from each other by the above-described method, the area ratio of martensite (fresh martensite and tempered martensite) is obtained.

The area ratio of the remainder in the microstructure is obtained by subtracting the area ratio of martensite from 100%.

"Region in which Average GAIQ Value in Unit Grain is 60,000 or More is 30 Area % or More"

In the present embodiment, in a cooling process during hot-stamping forming, the microstructure is transformed into martensite, and then the martensite grains having a relatively high dislocation density are auto-tempered into martensite grains having a relatively low dislocation density. Improving the bendability of the hot-stamping formed body by this is the greatest feature of the hot-stamping formed body according to the present embodiment. Therefore, in the present embodiment, it is important to quantify the proportion of auto-tempered martensite grains. Therefore, as a result of intensive examinations on a method for obtaining the proportion of auto-tempered martensite grains, the present inventors established the following method.

Regarding the proportion of auto-tempered martensite grains, crystal orientation information is measured for the metallographic structure of a test piece by an electron backscatter diffraction method, and the obtained measurement data is analyzed by a grain average image quality (GAIQ) parameter. A specific method is described below.

(Method of Measuring Area Ratio of Region in which Average GAIQ Value in Unit Grain is 60,000 or More)

A sample is cut out from a position 50 mm or more away from the end surface of the hot-stamping formed body (or a position avoiding the end portion) so that the sheet thickness cross section can be observed. The sheet thickness cross section of the sample is polished using #600 to #1500 silicon carbide paper and thereafter mirror-finished using a liquid obtained by dispersing a diamond powder having a particle size of 1 to 6 µm in a diluted solution such as alcohol or pure water. Next, the sheet thickness cross section of the sample is polished at room temperature using colloidal silica containing no alkaline solution for 8 minutes to remove strain introduced into the surface layer of the sample.

At any position in the longitudinal direction of the sheet thickness cross section of the sample, a region having a length of 50 μm from a ⅛ thickness depth from the surface to a ⅜ thickness depth from the surface is measured by an electron backscatter diffraction method at a measurement interval of 0.1 μm to obtain crystal orientation information. For the measurement, an apparatus including a thermal field-emission scanning electron microscope (JSM-7001F manufactured by JEOL Ltd.) and an EBSD detector (DVC5 type detector manufactured by TSL) is used. At this time, the degree of vacuum in the apparatus is set to $9.6 \times 10^{-3}$ Pa or less, the acceleration voltage is set to 15 kV, the irradiation current level is set to 13, and the electron beam irradiation level is set to 62.

For the obtained crystal orientation information, a grain average image quality map (GAIQ map) is obtained using the software "OIM Data Collection" function attached to the EBSD analyzer and the "Grain Average Misorientation" function installed in "OLM Analysis (registered trademark)". In the obtained GAIQ map, a region having a crystal orientation difference of 5° or more is defined as a grain, and the area ratio of a region in which the average GAIQ value in a unit grain is 60,000 or more is calculated. A region having an average GAIQ value of 60,000 or more is determined to be auto-tempered martensite.

FIG. 1 shows a distribution (histogram) of GAIQ values of a test piece in which auto-tempered grains and grains that are not auto-tempered are mixed. It is shown that the higher the GAIQ value, the lower the dislocation density, and the lower the GAIQ value, the higher the dislocation density. Therefore, the GAIQ value is a parameter that can reflect the dislocation density of grains.

In the histogram of the GAIQ values, grains whose dislocation density has been lowered by auto-tempering and grains which have not been auto-tempered and have a high dislocation density can be separated from each other. As described above, in the present embodiment, the region in which the average GAIQ value in the unit grain is 60,000 or more is determined to be auto-tempered martensite grains.

Figure 2:
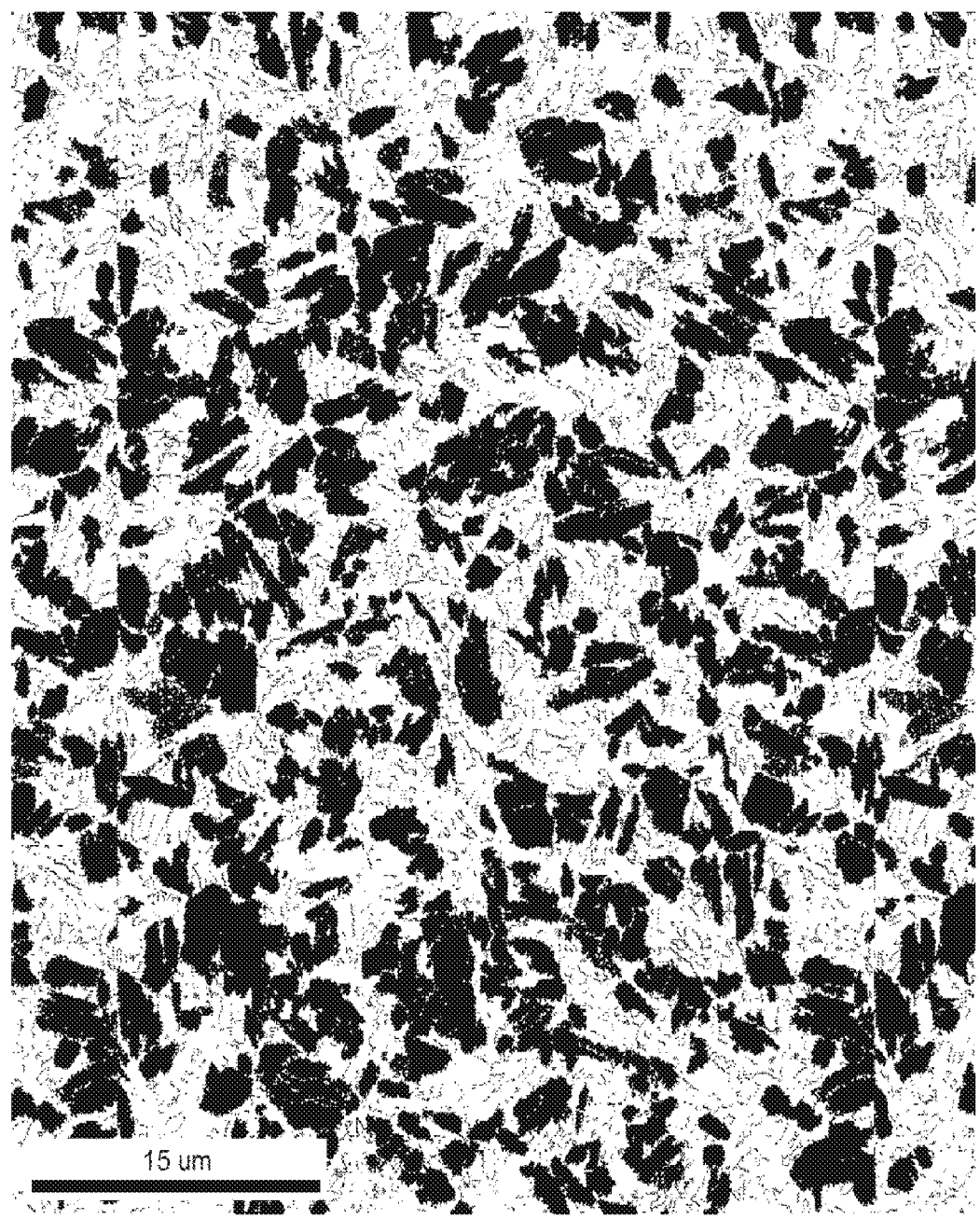
FIG. 2 is a diagram showing a GAIQ map created by binarization using a GAIQ value of 60,000 as a boundary value in a hot-stamping formed body of Test No. 52 which is an example.

FIG. 2 shows a GAIQ map created by binarization using a GAIQ value of 60,000 as a boundary value. According to the GAIQ map shown in FIG. 2, grains (black regions) whose dislocation density has been lowered by auto-tempering can be easily visualized. White regions in FIG. 2 indicate grains that are not sufficiently auto-tempered and have a high dislocation density. In addition, the "region in which the average GAIQ value in the unit grain is 60,000 or more" can be determined to be sufficiently auto-tempered martensite grains, the proportion (area ratio) thereof can be calculated.

In the present embodiment, when the region in which the average GAIQ value in the unit grains is 60,000 or more occupies 30 area % or more, the microstructure can be regarded as having a sufficient amount of auto-tempered martensite grains present therein. As a result, the bendability of the hot-stamping formed body can be improved. Therefore, the region in which the average GAIQ value in the unit grain is 60,000 or more occupies 30 area % or more. The area ratio thereof is preferably set to 40 area % or more, 50 area % or more, 60 area % or more, and 70 area % or more.

On the other hand, the upper limit of the area ratio of the region in which the average GAIQ value in the unit grain is 60,000 or more is not particularly limited, but when there are too many auto-tempered martensite grains, there are cases where a tensile strength of 1,500 MPa or more cannot be secured. Therefore, the region in which the average GAIQ value in the unit grain is 60,000 or more occupies preferably 95 area % or less, and more preferably 90 area % or less.

"Number Density of Carbides Having Circle Equivalent Diameter of 0.20 μm or More is 50/mm² or Less"

When the microstructure of the hot-stamping formed body contains a large amount of coarse carbides, the bendability of the hot-stamping formed body deteriorates. Therefore, it is desirable that the amount of coarse carbide is as small as possible. In the present embodiment, the number density of carbides having a circle equivalent diameter of 0.20 μm or more is preferably set to 50/mm² or less. The lower limit of the number density of carbides having a circle equivalent diameter of 0.20 μm or more is not particularly specified, but may be 0/mm² or 1/mm².

"Average Particle Size of Carbides is 0.20 μm or Less"

The average particle size of carbides is preferably 0.20 μm or less. By setting the average particle size of carbides to 0.20 μm or less, the bendability of the hot-stamping formed body can be further improved. The average particle size of carbides is more preferably 0.15 μm or less and 0.13 μm or less. The lower limit of the average particle size of carbides is not particularly specified, but may be 0.005 μm.

(Method of Measuring Average Particle Size and Number Density of Carbides)

A sample is taken so that the sheet thickness cross section parallel to a rolling direction becomes an observed section, and the observed section is finished by electrolytic polishing. Thereafter, a region from a ⅛ thickness depth from the surface to a ⅜ thickness depth from the surface is observed for 10 or more visual fields at a magnification of 20,000-fold. The circle equivalent diameter of each carbide is obtained from the observed area of each carbide by image analysis. The average value thereof is calculated to obtain the average particle size of carbides.

In addition, by calculating the number density of carbides having a circle equivalent diameter of 0.20 μm or more, the number density of carbides having a circle equivalent diameter of 0.20 μm or more is obtained.

In the present embodiment, particles having a major axis of 5 nm or more present in the laths or in the form of laths in martensite are regarded as carbides.

"Tensile Strength TS: 1,500 MPa or More"

The tensile strength TS of the hot-stamping formed body is preferably 1,500 MPa or more. The tensile strength TS is more preferably 1,600 MPa or more and 1,700 MPa or more. The upper limit of the tensile strength TS does not need to be specified in particular, but may be set to 3,500 MPa.

The tensile strength TS is measured according to the test method described in JIS Z 2241:2011 by producing a No. 5 test piece described in JIS Z 2241:2011 from any position in the hot-stamping formed body.

"Bendability: TS×α is 75,000 MPa·Deg or More"

Regarding the bendability of the hot-stamping formed body, TS×α is preferably 75,000 MPa·deg or more. TS×α is obtained by multiplying the tensile strength TS (MPa) by the maximum bending angle α (deg). TS×α is more preferably 90,000 MPa·deg or more and 100,000 MPa·deg or more. The upper limit of TS×α is not particularly specified, but may be 160,000 MPa·deg.

The maximum bending angle α is obtained by performing a bending test under the following conditions based on the VDA standard (VDA238-100) specified by the German Association of the Automotive Industry. The maximum bending angle α is obtained by converting the displacement at the maximum load obtained by the bending test into an angle based on the VDA standard and obtaining the maximum bending angle α (deg).

Test piece dimensions: 60 mm×60 mm
Bending ridge: Any one direction
Test method: Supporting with rolls, pressing with a punch
Roll diameter: φ30 mm
Punch shape: Tip end R=0.4 mm
Distance between rolls: 2.0×sheet thickness (mm)+0.5 mm
Pressing speed: 20 mm/min
Tester: SHIMADZU AUTOGRAPH 20 kN <Method of Manufacturing Hot-Stamping Formed Body>

Next, a preferred manufacturing method of the hot-stamping formed body according to the present embodiment will be described. First, a method of manufacturing the steel sheet for hot stamping applied to the hot-stamping formed body according to the present embodiment will be described.

(Method of Manufacturing Steel Sheet for Hot Stamping)

Using a steel piece having the above chemical composition, for example, a steel sheet for hot stamping is manufactured by the following manufacturing method.

"Heating Step"

A steel piece (steel) to be subjected to hot rolling may be a steel piece manufactured by an ordinary method, and may be, for example, a steel piece manufactured by a general method such as a continuously cast slab or a thin slab caster. Before the steel having the above-described chemical composition is subjected to hot rolling, the steel is heated to 1,100° C. or higher and held in the temperature range for 20 minutes or longer. After holding the steel in the temperature range, hot rolling is performed.

In a case where the heating temperature is lower than 1,100° C. or the retention time is shorter than 20 minutes, re-dissolving of coarse inclusions such as Ti does not proceed and the coarse inclusions remain as fracture origins in the product (hot-stamping formed body. As a result, there are cases where the bendability of the hot-stamping formed body deteriorates. Preferably, the heating temperature is 1,200° C. or higher, and the retention time is 25 minutes or longer. A preferable upper limit of the heating temperature is 1,350° C. and a preferable upper limit of the retention time is 120 minutes.

"Finish Rolling Step"

Next, it is preferable to perform finish rolling in a temperature range of an $Ar_3$ point or higher. When the finish rolling is completed at a temperature lower than the $Ar_3$ point, there are cases where dual phase rolling is performed and the shape of the sheet deteriorates due to the rolling. Therefore, the finish rolling temperature is preferably set to the $Ar_3$ point or higher. More preferably, the finish rolling temperature is the $Ar_3$ point+30° C. or higher. A preferable upper limit of the finish rolling temperature is 1,050° C.

The $Ar_3$ point is represented by Expression (1). Each element symbol in Expression (1) indicates the amount (mass %) of the corresponding element, and 0 is substituted in a case where the corresponding element is not contained.

$$Ar_3 \text{ point}=850+10\times(C+N)\times Mn+350\times Nb+250\times Ti+40\times B+10\times Cr+100\times Mo \quad \text{Expression (1)}$$

"Coiling Step"

The steel sheet after the finish rolling is coiled into a coil shape in a temperature range of 750° C. or lower. Accordingly, a hot-rolled steel sheet is obtained. When the coiling temperature exceeds 750° C., a large amount of scale is generated, which makes it difficult to remove the scale in a pickling step which is a subsequent step. Therefore, the coiling temperature is preferably set to 750° C. or lower. The coiling temperature is more preferably 600° C. or lower. A preferable lower limit of the coiling temperature is 350° C.

The hot-rolled steel sheet obtained by the above method may be subjected to a re-heating treatment for the purpose of softening, as necessary. A cold-rolled steel sheet may be obtained by cold-rolling the hot-rolled steel sheet, or a plated steel sheet may be obtained by applying plating. In addition, continuous annealing may also be performed.

The cold rolling may be cold rolling performed at a normal cumulative rolling reduction, for example, a cumulative rolling reduction of 30% to 90%.

The hot-rolled steel sheet or the cold-rolled steel sheet may have a plating layer on the surface. Various known hot-dip metal plating, electro plating, and the like may be performed depending on the purpose such as suppressing the generation of scale in a hot stamping step and improving the corrosion resistance of the hot-stamping formed body.

Examples of the hot-dip metal plating include hot-dip galvanizing, hot-dip galvannealing, hot-dip aluminum plating, and hot-dip aluminum-zinc plating. When a hot-dip metal plating layer is full hard, there are cases where a crack occurs during hot-stamping forming and the corrosion resistance of the hot-stamping formed body deteriorates. Therefore, the hot-dip metal plating is preferably hot-dip galvanizing or hot-dip galvannealing in which the plating layer becomes soft.

In a case where the hot-dip metal plating is hot-dip galvanizing or hot-dip galvannealing, the amount of plating adhered to the surface of the hot-rolled steel sheet or cold-rolled steel sheet is preferably 3 to 800 $g/m^2$ per surface. When the plating adhesion amount is less than 3 $g/m^2$ per surface, there are cases where the effect of improving corrosion resistance cannot be reliably obtained. On the other hand, when the plating adhesion amount exceeds 800 $g/m^2$ per surface, there are cases where defects such as blowholes easily occur during welding. From the viewpoint of improving corrosion resistance and suppressing the cost, it is more preferable that the plating adhesion amount is 10 to 200 $g/m^2$.

In order to suppress evaporation of the plating layer before hot-stamping forming and improve the corrosion resistance of the hot-stamping formed body, it is preferable that the plating is hot-dip galvannealing. As for the degree of alloying of the hot-dip galvannealing, it is preferable that the Fe content in the plating layer is 3% to 25%. When the Fe content in the plating coating is less than 3%, there are cases where evaporation of the plating layer during hot-stamping forming cannot be sufficiently suppressed. When the Fe content in the plating layer exceeds 25%, there are cases where the powdering property of the hot-stamping formed body deteriorates.

From the viewpoint of suppressing evaporation of the plating layer and securing the powdering property, the Fe content in the plating layer is more preferably 7% to 18%. The surface of the hot-dip galvanized layer or the hot-dip galvannealed layer may be further subjected to an organic or inorganic coating.

(Method of Manufacturing Hot-Stamping Formed Body)

Using the steel sheet for hot stamping obtained by the above method, for example, a hot-stamping formed body is manufactured by the following manufacturing method. Accordingly, the hot-stamping formed body according to the present embodiment can be obtained.

"Heating Step"

In a hot stamping step, the steel sheet for hot stamping is heated at an average heating rate of 150° C./s or slower. When the average heating rate exceeds 150° C./s, re-dissolving of carbides does not proceed, and the carbides becomes bending crack origins. As a result, there are cases where the bendability of the hot-stamping formed body deteriorates. The average heating rate is preferably 100° C./s or slower. The lower limit of the average heating rate is not particularly limited, but is preferably 1° C./s or faster, and more preferably 2° C./s or faster from the viewpoint of productivity.

The heating temperature is set to a temperature range of an $Ac_3$ point or higher, and after holding in the temperature range, hot forming (hot stamping) is performed. In a case where the heating temperature is lower than the $Ac_3$ point, the heating is performed in a dual phase region, and ferrite precipitates. As a result, an inhomogeneous structure is formed, and re-dissolving of carbides does not proceed, so that there are cases where the bendability of the hot-stamping formed body deteriorates. Therefore, the heating temperature is set to the $Ac_3$ point or higher. The heating temperature is preferably $Ac_3+20°$ C. or higher. The upper limit of the heating temperature is not particularly limited, but the higher the heating temperature, the higher the heating cost. Therefore, from the viewpoint of production cost, the heating temperature is preferably set the $Ac_3$ point+100° C. or lower. The heating temperature is more preferably the $Ac_3$ point+80° C. or lower. The retention time at the heating temperature may be 10 to 300 seconds.

The $Ac_3$ point is represented by Expression (2). Each element symbol in Expression (2) indicates the amount (mass %) of the corresponding element, and 0 is substituted in a case where the corresponding element is not contained.

$Ac_3$ point=910−203×$C^{0.5}$+66×Si−25×Mn+700×P−11× Cr+109×sol. Al+400×Ti−15.2×Ni+104×V+31.5× Mo    Expression (2)

"Cooling Step"

After the hot stamping is completed, it is preferable to perform cooling to a temperature range of 180° C. to 220° C. That is, after the completion of hot stamping, a cooling stop temperature is preferably in a temperature range of 180° C. to 220° C. The cooling stop temperature after the completion of hot stamping is more preferably set to 190° C. or higher, or 195° C. or higher. The cooling stop temperature after the completion of hot stamping is preferably 210° C. or lower, or 205° C. or lower.

The present inventors newly found that in a case where a steel sheet containing 0.10 to 4.00 mass % of Co is hot-stamped, by setting the cooling stop temperature after the completion of hot stamping in a temperature range of 180° C. to 220° C., a region in which the average GAIQ value in a unit grain is 60,000 or more tends to occupy 30 area % or more and the tensile strength tends to be 1,500 MPa or more. In addition, the present inventors newly found that the above tendency can be seen only in a case where a steel sheet containing 0.10 mass % or more of Co is hot-stamped, and the above tendency is not seen in a case where a steel sheet that does not contain 0.10 mass % or more of Co is hot-stamped.

Figure 4:
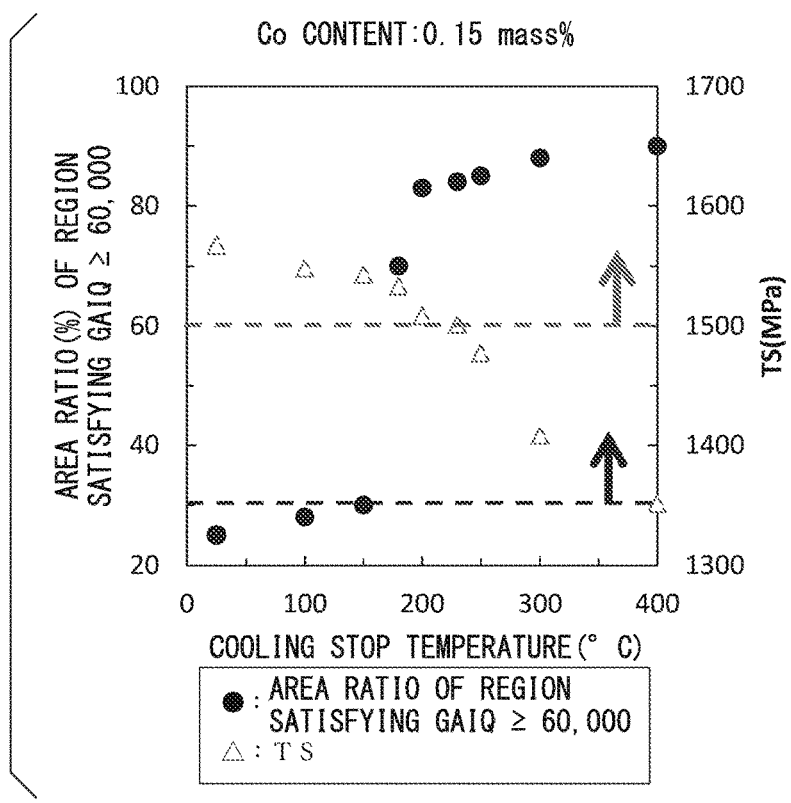
FIG. 4 shows, in a case where a steel in which the Co content is within the range of the present invention is used, the relationship between the cooling stop temperature after the completion of hot stamping and the area ratio and tensile strength of a region in which the average GAIQ value in a unit grain is 60,000 or more.
Figure 5:
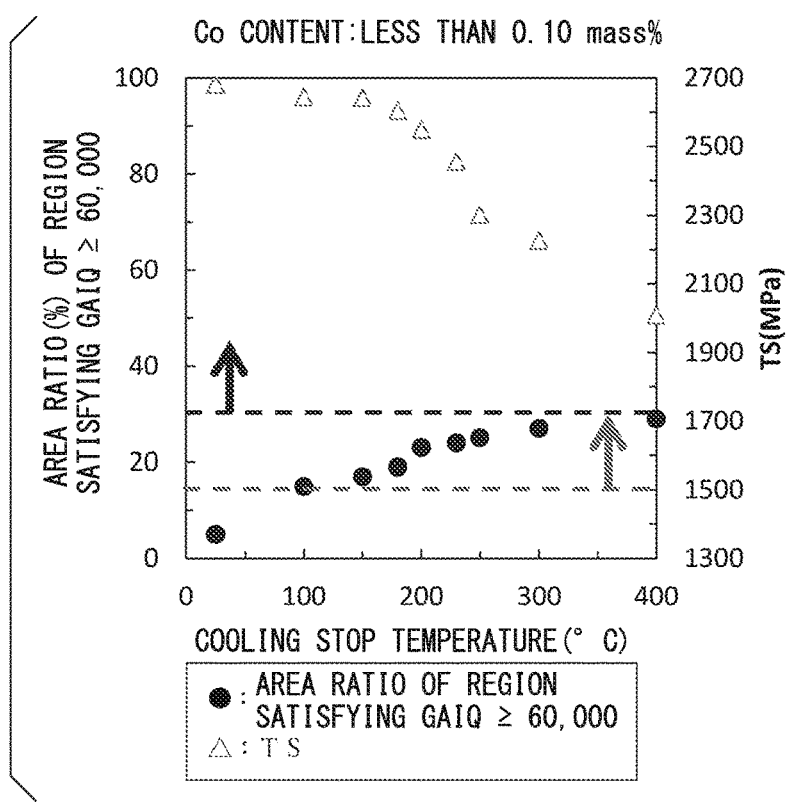
FIG. 5 shows, in a case where a steel in which the Co content is outside the range of the present invention is used, the relationship between the cooling stop temperature after the completion of hot stamping and the area ratio and tensile strength of a region in which the average GAIQ value in a unit grain is 60,000 or more.

FIG. 4 shows, in a case where a steel sheet for hot stamping manufactured using Steel No. 2 (Co content: 0.15 mass %) of an example described later is hot-stamped, the relationship between the cooling stop temperature after the completion of hot stamping and the area ratio and tensile strength of a region in which the average GAIQ value in a unit grain is 60,000 or more. FIG. 5 shows, in a case where hot stamping is performed using Steel No. 51 (Co content: less than 0.10 mass %) of an example described later, the relationship between the cooling stop temperature after the completion of hot stamping and the area ratio and tensile strength of a region in which the average GAIQ value in a unit grain is 60,000 or more. In FIG. 4, it can be seen that by setting the cooling stop temperature after the completion of hot stamping to a temperature range of 180° C. to 220° C., the region in which the average GAIQ value in a unit grain is 60,000 or more occupies 30 area % or more, and has a tensile strength of 1.500 MPa or more. On the other hand, in FIG. 5, it can be seen that even if the cooling stop temperature after the completion of hot stamping is set to the temperature range of 180° C. to 220° C., the region in which the average GAIQ value in a unit grain is 60,000 or more does not occupies 30 area % or more.

In order to set the cooling stop temperature after the completion of hot stamping to the temperature range of 180° C. to 220° C., for example, a method of performing hot stamping with a die heated to 200° C., a method of shortening a time for holding a bottom dead point during hot stamping using a die at room temperature which is not heated, a method of controlling the spray amount of a cooling medium sprayed from a nozzle in a die, and a method of reducing the amount of generated heat from a steel sheet by providing a gap in a die can be adopted.

The completion of hot stamping means the time at which a punch reaches the bottom dead point. The hot stamping completion temperature may be 650° C. or higher. The cooling stop temperature mentioned here means the surface temperature of the hot-stamping formed body when holding of the die is completed (when the punch is separated from the bottom dead point).

The average cooling rate in the temperature range from the temperature after the completion of hot stamping to the cooling stop temperature is preferably set to 5 to 500° C./s. By controlling the average cooling rate in the above temperature range to 5 to 500° C./s, it becomes possible to allow the microstructure of the hot-stamping formed body to primarily include martensite (including tempered martensite).

In a case where the average cooling rate in the temperature range from the temperature after the completion of hot stamping to the cooling stop temperature is slower than 5° C./s, there are cases where hardening does not sufficiently proceed and a soft phase such as ferrite is formed in the microstructure. As a result, there are cases where the tensile strength of the hot-stamping formed body is less than 1,500 MPa. Therefore, the average cooling rate in the above temperature range is preferably set to 5° C./s or faster. The average cooling rate is more preferably 30° C./s or faster. On the other hand, in a case where the average cooling rate in the above temperature range exceeds 500° C./s, auto-tempering (self-tempering) of martensite does not proceed sufficiently, and there are cases where the area ratio of the region in which the average GAIQ value in a unit grain is 60,000 or more decreases. As a result, there are cases where the bendability of the hot-stamping formed body deteriorates. Therefore, the average cooling rate in the above temperature range is set to 500° C./s or slower. The average cooling rate is preferably 300° C./s or slower.

It is important to lower the average cooling rate in a temperature range of lower than or equal to the cooling stop temperature as much as possible in order to increase the proportion of auto-tempered martensite grains. The average cooling rate in a temperature range from the cooling stop temperature to 100° C. is preferably set to slower than 10° C./s. In particular, the average cooling rate in a temperature range from 150° C. to 100° C. is more preferably set to slower than 10° C./s. Cooling in a temperature range of lower than or equal to the cooling stop temperature may be performed by air cooling and air cooling in a heating furnace.

After the hot stamping and cooling, for the purpose of adjusting the strength, tempering may be performed by heating to a temperature range of 100° C. to 600° C. and holding in the temperature range. However, when annealing is performed in a temperature range of 300° C. to 600° C., there are cases where TS×α becomes less than 75,000 MPa-deg. Therefore, it is not preferable to perform annealing in a temperature range of 300° C. to 600° C.

In addition, for the purpose of improving the deformability of the hot-stamping formed body, a softened region may be provided in a portion of the hot-stamping formed body after hot stamping and cooling. The softened region mentioned here means a softened region or the like provided in a portion of the hot-stamping formed body by irradiating the portion (for example, a flange portion) of the hot-stamping formed body with a laser to partially temper the portion.

EXAMPLES

Next, the examples of the present invention will be described. However, the conditions in the examples are one example of conditions adopted to confirm the feasibility and effects of the present invention, and the present invention is not limited to this one example of conditions. The present invention can adopt various conditions as long as the object of the present invention is achieved without departing from the gist of the present invention.

Steels having the chemical compositions shown in Tables 1A to 3B were melted and continuously cast to obtain steel pieces. The steel piece was heated to 1,150° C., held in the temperature range for 30 minutes, and then hot-rolled so that the finish rolling temperature was 970° C., thereby obtaining a hot-rolled steel strip. The obtained hot-rolled steel strip was coiled into a coil shape at 550° C. The hot-rolled steel strip was cold-rolled under the condition that the cumulative rolling reduction was 50%, thereby obtaining a steel sheet for hot stamping (cold-rolled steel sheet) having a thickness of 1.6 mm.

Some of the hot-stamping formed bodies were tempered by heating to a temperature range of 100° C. or higher and lower than 300° C. and holding for the purpose of adjusting the strength. For the hot-stamping formed bodies that had been tempered, "Present" is described in the "Annealing" column in Tables 4 to 6. In addition, some of the steel sheets for hot stamping were hot-dip galvanized to obtain plated steel sheets for hot stamping. The amount of plating adhered was set to 10 to 200 g/m² per surface. For the steel sheets for hot stamping that had been hot-dip galvanized, "Present" is described in the "Plating" column in Tables 7 to 9.

Each of the obtained steel sheets for hot stamping and the plated steel sheets for hot stamping (hereinafter collectively referred to as "steel sheets for hot stamping") were subjected to hot stamping under the conditions shown in Tables 4 to 6 to obtain hot-stamping formed bodies. The cooling stop temperature after the completion of hot stamping was set to a temperature range of 180° C. to 220° C. In addition, cooling in the temperature range of lower than or equal to the cooling stop temperature was performed by air cooling or air cooling in a heating furnace.

For some of the hot-stamping formed bodies, a portion of the hot-stamping formed body was irradiated with a laser to be heated to 200° C., thereby forming a partially softened region. Regarding the hot-stamping formed bodies in which the partially softened region was formed, "Present" is described in the "Partially softened region" column in the tables.

Figure 3:
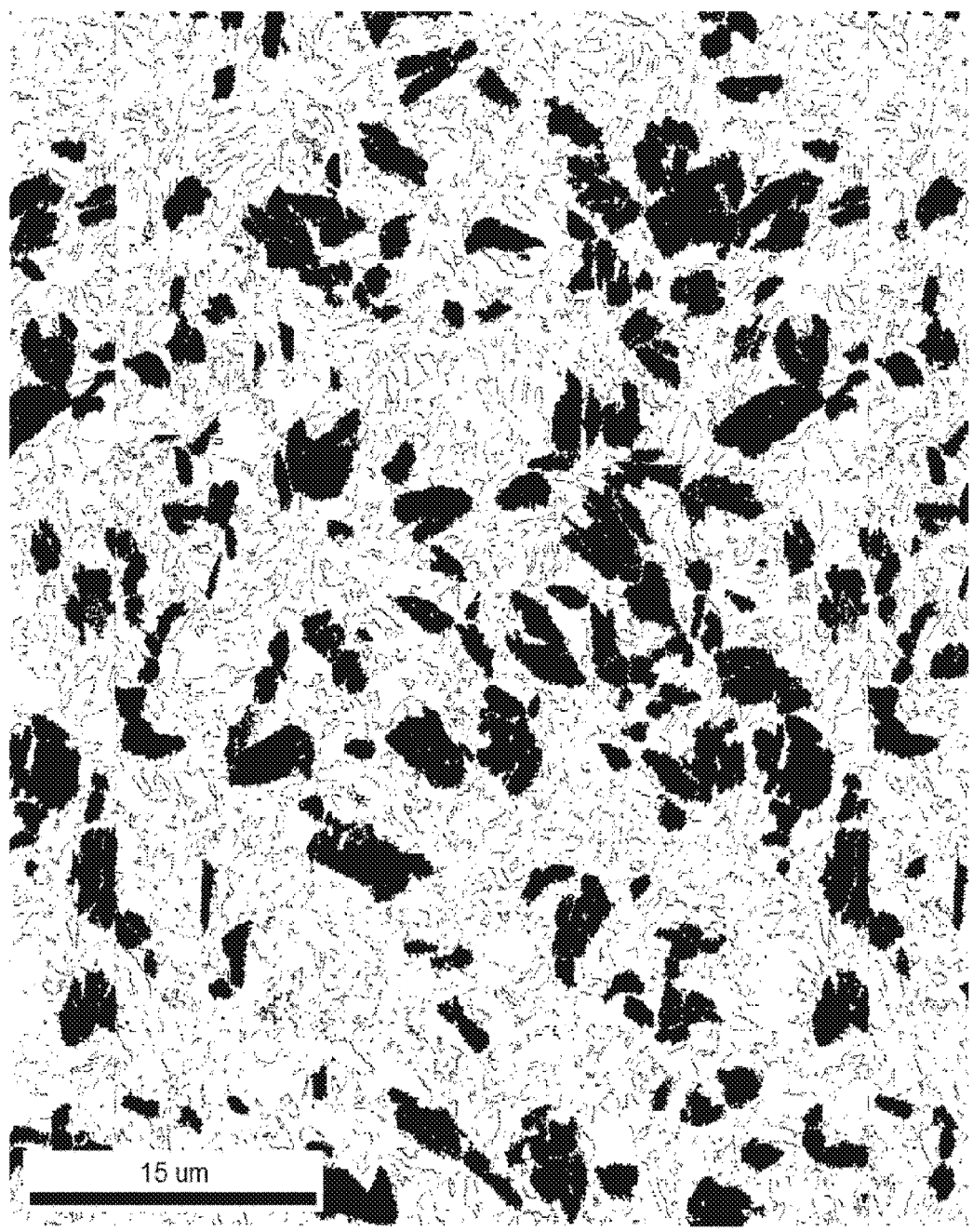
FIG. 3 is a diagram showing a GAIQ map created by binarization using a GAIQ value of 60,000 as a boundary value in a hot-stamping formed body of Test No. 74 which is an example.

The microstructure of the hot-stamping formed bodies was measured by the above-mentioned measurement methods. In addition, the mechanical properties of the hot-stamping formed body were measured. The results are shown in Tables 7 to 9. FIGS. 2 and 3 GAIQ maps created by binarization using an average GAIQ value of 60,000 in a unit grain as a boundary value in Test No. 52 which is an invention example and Test No. 74 which is a comparative example.

The mechanical properties of the hot-stamping formed body were measured and evaluated by the following methods.

"Tensile Strength"

The tensile strength of the hot-stamping formed body was obtained in accordance with the test method described in JIS Z 2241:2011 by producing a No. 5 test piece described in JIS Z 2241:2011 from any position in the hot-stamping formed body. In a case where the tensile strength TS was 1,500 MPa or mom, having excellent strength and being acceptable was determined. On the other hand, in a case where the tensile strength TS is less than 1,500 MPa, being inferior in strength and being unacceptable was determined.

"Bendability"

The bendability was evaluated under the following measurement conditions based on the VDA standard (VDA238-100) specified by the German Association of the Automotive Industry. In this example, the maximum bending angle α (deg) was obtained by converting the displacement at the maximum load obtained by the bending test into an angle based on the VDA standard. In a case where the product (TS×α) of the tensile strength TS (MPa) and the maximum bending angle α (deg) obtained by the above method was 75,000 MPa-deg or more, having excellent bendability and being acceptable was determined. On the other hand, in a case where TS×α was less than 75,000 MPa-deg, being inferior in bendability and being unacceptable was determined.

(Measurement Conditions of Bending Test)

Test piece dimensions: 60 mm (rolling direction)×60 mm (orthogonal-to-rolling direction)

Bending ridge: Orthogonal-to-rolling direction

Test method: Supporting with rolls, pressing with a punch

Roll diameter: φ30 mm

Punch shape: Tip end R=0.4 mm

Distance between rolls: 2.0×sheet thickness (mm)+0.5 mm

Pressing speed: 20 mm/min

Tester: SHIMADZU AUTOGRAPH 20kN

TABLE 1A

| Steel No. | Chemical composition (mass %), remainder consisting of Fe and impurities | | | | | | | | | | | |
|---|---|---|---|---|---|---|---|---|---|---|---|---|
| | C | Si | Mn | P | S | sol.Al | N | Ti | Cr | B | Mo | Co |
| 1 | 0.19 | 0.30 | 0.36 | 0.010 | 0.0009 | 0.028 | 0.0026 | 0.010 | 0.08 | 0.0026 | 0.50 | 0.14 |
| 2 | 0.21 | 0.18 | 0.40 | 0.005 | 0.0015 | 0.030 | 0.0030 | 0.022 | 0.07 | 0.0022 | 0.42 | 0.15 |
| 3 | 0.45 | 0.13 | 0.40 | 0.010 | 0.0005 | 0.040 | 0.0045 | 0.024 | 0.30 | 0.0028 | 0.15 | 0.30 |
| 4 | 0.69 | 0.10 | 0.20 | 0.010 | 0.0005 | 0.350 | 0.0024 | 0.022 | 0.06 | 0.0030 | 0.11 | 4.00 |
| 5 | 0.75 | 0.10 | 0.28 | 0.006 | 0.0010 | 0.026 | 0.0026 | 0.030 | 0.09 | 0.0014 | 0.30 | 0.20 |
| 6 | 0.35 | 0.003 | 0.40 | 0.011 | 0.0007 | 0.030 | 0.0017 | 0.021 | 0.30 | 0.0020 | 0.15 | 0.15 |
| 7 | 0.30 | 0.010 | 0.30 | 0.006 | 0.0006 | 0.030 | 0.0022 | 0.026 | 0.05 | 0.0010 | 0.38 | 0.14 |
| 8 | 0.35 | 0.65 | 0.10 | 0.012 | 0.0008 | 0.029 | 0.0034 | 0.023 | 0.03 | 0.0016 | 0.30 | 0.55 |
| 9 | 0.31 | 1.30 | 0.44 | 0.006 | 0.0010 | 0.020 | 0.0028 | 0.030 | 0.35 | 0.0018 | 0.40 | 0.26 |
| 10 | 0.30 | 1.50 | 0.35 | 0.008 | 0.0004 | 0.022 | 0.0026 | 0.030 | 0.20 | 0.0026 | 0.38 | 0.10 |
| 11 | 0.25 | 0.30 | 0.001 | 0.007 | 0.0007 | 0.030 | 0.0022 | 0.022 | 0.10 | 0.0026 | 0.50 | 0.26 |
| 12 | 0.40 | 0.26 | 0.24 | 0.008 | 0.0003 | 0.028 | 0.0020 | 0.018 | 0.06 | 0.0018 | 0.30 | 0.10 |
| 13 | 0.40 | 0.10 | 0.48 | 0.010 | 0.0006 | 0.028 | 0.0026 | 0.010 | 0.10 | 0.0022 | 0.34 | 0.26 |
| 14 | 0.29 | 0.25 | 1.30 | 0.010 | 0.0100 | 0.042 | 0.0043 | 0.025 | 0.20 | 0.0014 | 0.13 | 0.10 |
| 15 | 0.45 | 0.10 | 0.36 | 0.005 | 0.0006 | 0.028 | 0.0030 | 0.030 | 0.06 | 0.0018 | 0.38 | 0.18 |
| 16 | 0.35 | 0.20 | 0.35 | 0.050 | 0.0007 | 0.033 | 0.0036 | 0.020 | 0.10 | 0.0020 | 0.15 | 0.50 |
| 17 | 0.35 | 0.26 | 0.36 | 0.100 | 0.0009 | 0.028 | 0.0026 | 0.022 | 0.07 | 0.0026 | 0.30 | 0.22 |
| 18 | 0.47 | 0.30 | 0.40 | 0.110 | 0.0003 | 0.030 | 0.0020 | 0.030 | 0.30 | 0.0019 | 0.30 | 0.13 |
| 19 | 0.30 | 0.30 | 0.28 | 0.006 | 0.0002 | 0.028 | 0.0022 | 0.014 | 0.09 | 0.0026 | 0.50 | 0.18 |
| 20 | 0.34 | 0.23 | 0.40 | 0.012 | 0.0050 | 0.031 | 0.0045 | 0.020 | 0.20 | 0.0021 | 0.40 | 0.20 |
| 21 | 0.25 | 0.26 | 0.36 | 0.006 | 0.0100 | 0.024 | 0.0030 | 0.010 | 0.05 | 0.0018 | 0.42 | 0.16 |
| 22 | 0.35 | 0.21 | 0.40 | 0.010 | 0.0110 | 0.033 | 0.0040 | 0.020 | 0.20 | 0.0020 | 0.39 | 0.20 |
| 23 | 0.22 | 0.30 | 0.40 | 0.010 | 0.0020 | 0.0008 | 0.0025 | 0.030 | 0.30 | 0.0017 | 0.20 | 0.30 |
| 24 | 0.25 | 0.18 | 0.24 | 0.009 | 0.0010 | 0.0010 | 0.0020 | 0.014 | 0.06 | 0.0022 | 0.34 | 0.22 |
| 25 | 0.21 | 0.18 | 0.45 | 0.010 | 0.0020 | 0.250 | 0.0020 | 0.014 | 0.06 | 0.0022 | 0.40 | 0.30 |

Underline means outside the rane specified in the present invention.

TABLE 1B

| Steel No. | Chemical composition (mass %), remainder consisting of Fe and impurities | | | | | | Ac3 (° C.) | Ar3 (° C.) | Ms (° C.) | Note |
|---|---|---|---|---|---|---|---|---|---|---|
| | Ni | V | Nb | Ca | Mg | REM | | | | |
| 1 | | | | | | | 861 | 904 | 466 | Comparative Steel |
| 2 | | | | | | | 847 | 899 | 458 | Invention Steel |
| 3 | | | | | | | 795 | 876 | 371 | Invention Steel |
| 4 | | | | | | | 800 | 869 | 362 | Invention Steel |
| 5 | | | | | | | 761 | 891 | 269 | Comparative Steel |
| 6 | | | | | | | 801 | 875 | 404 | Comparative Steel |
| 7 | | | | | | | 821 | 896 | 429 | Invention Steel |
| 8 | | | | | | | 853 | 888 | 415 | Invention Steel |
| 9 | | | | | | | 899 | 902 | 416 | Invention Steel |
| 10 | | | | | | | 919 | 899 | 424 | Comparative Steel |
| 11 | | | | | | | 859 | 907 | 459 | Invention Steel |
| 12 | | | | | | | 817 | 887 | 395 | Invention Steel |
| 13 | | | | | | | 800 | 890 | 388 | Invention Steel |
| 14 | | | 0.080 | 0.0030 | | | 808 | 903 | 393 | Comparative Steel |
| 15 | | | | | | | 802 | 898 | 374 | Invention Steel |
| 16 | | | | | | | 845 | 872 | 416 | Invention Steel |
| 17 | | | | | | | 888 | 888 | 410 | Invention Steel |
| 18 | | | | | | | 879 | 892 | 360 | Comparative Steel |
| 19 | | | | | | | 839 | 905 | 429 | Invention Steel |
| 20 | | | | | | | 827 | 898 | 410 | Invention Steel |
| 21 | | | | | | | 840 | 896 | 444 | Invention Steel |
| 22 | | | | | | | 822 | 897 | 406 | Comparative Steel |
| 23 | | | | | | | 847 | 881 | 453 | Comparative Steel |
| 24 | | | | | | | 836 | 889 | 449 | Invention Steel |
| 25 | | | | | | | 870 | 895 | 465 | Invention Steel |

Underline means outside the range specified in he present invention.

TABLE 2A

| Steel No. | \multicolumn{12}{c}{Chemical composition (mass %), remainder consisting of Fe and impurities} |
|---|---|---|---|---|---|---|---|---|---|---|---|---|
| | C | Si | Mn | P | S | sol.Al | N | Ti | Cr | B | Mo | Co |
| 26 | 0.45 | 0.26 | 0.40 | 0.007 | 0.0003 | 0.500 | 0.0026 | 0.020 | 0.10 | 0.0022 | 0.45 | 0.30 |
| 27 | 0.44 | 0.26 | 0.38 | 0.005 | 0.0007 | 0.550 | 0.0020 | 0.023 | 0.15 | 0.0022 | 0.45 | 0.22 |
| 28 | 0.30 | 0.10 | 0.28 | 0.006 | 0.0006 | 0.020 | 0.0010 | 0.018 | 0.08 | 0.0022 | 0.50 | 0.30 |
| 29 | 0.34 | 0.20 | 0.46 | 0.010 | 0.0015 | 0.040 | 0.0050 | 0.029 | 0.20 | 0.0025 | 0.15 | 0.25 |
| 30 | 0.21 | 0.30 | 0.36 | 0.005 | 0.0010 | 0.024 | 0.0100 | 0.018 | 0.06 | 0.0030 | 0.50 | 0.14 |
| 31 | 0.22 | 0.14 | 0.28 | 0.005 | 0.0006 | 0.020 | 0.0110 | 0.026 | 0.08 | 0.0026 | 0.50 | 0.18 |
| 32 | 0.21 | 0.10 | 0.40 | 0.010 | 0.0020 | 0.009 | 0.0040 | 0.008 | 0.20 | 0.0020 | 0.15 | 2.00 |
| 33 | 0.45 | 0.26 | 0.32 | 0.009 | 0.0009 | 0.024 | 0.0030 | 0.010 | 0.09 | 0.0026 | 0.30 | 0.22 |
| 34 | 0.45 | 0.23 | 0.35 | 0.010 | 0.0005 | 0.030 | 0.0035 | 0.050 | 0.10 | 0.0025 | 0.30 | 0.20 |
| 35 | 0.30 | 0.30 | 0.40 | 0.008 | 0.0009 | 0.020 | 0.0022 | 0.100 | 0.09 | 0.0018 | 0.38 | 0.14 |
| 36 | 0.40 | 0.26 | 0.20 | 0.009 | 0.0004 | 0.020 | 0.0022 | 0.120 | 0.05 | 0.0010 | 0.34 | 0.14 |
| 37 | 0.22 | 0.25 | 0.42 | 0.010 | 0.0007 | 0.028 | 0.0025 | 0.020 | 0.006 | 0.0021 | 0.35 | 0.20 |
| 38 | 0.21 | 0.18 | 0.40 | 0.010 | 0.0023 | 0.028 | 0.0022 | 0.022 | 0.010 | 0.0018 | 0.35 | 0.26 |
| 39 | 0.22 | 0.23 | 0.40 | 0.010 | 0.0020 | 0.030 | 0.0026 | 0.020 | 0.40 | 0.0020 | 0.30 | 0.10 |
| 40 | 0.25 | 0.30 | 0.20 | 0.009 | 0.0006 | 0.022 | 0.0022 | 0.018 | 0.80 | 0.0030 | 0.46 | 0.18 |
| 41 | 0.22 | 0.010 | 0.25 | 0.010 | 0.0010 | 0.030 | 0.0040 | 0.020 | 1.06 | 0.0020 | 0.15 | 0.10 |
| 42 | 0.21 | 0.10 | 0.30 | 0.010 | 0.0008 | 0.028 | 0.0030 | 0.025 | 0.19 | 0.0001 | 0.15 | 0.80 |
| 43 | 0.34 | 0.22 | 0.29 | 0.009 | 0.0003 | 0.022 | 0.0026 | 0.022 | 0.20 | 0.0005 | 0.46 | 0.70 |
| 44 | 0.34 | 0.20 | 0.30 | 0.010 | 0.0005 | 0.021 | 0.0028 | 0.021 | 0.20 | 0.0050 | 0.45 | 0.50 |
| 45 | 0.33 | 0.18 | 0.32 | 0.009 | 0.0006 | 0.028 | 0.0020 | 0.026 | 0.21 | 0.0100 | 0.46 | 0.26 |
| 46 | 0.35 | 0.21 | 0.30 | 0.010 | 0.0007 | 0.030 | 0.0030 | 0.025 | 0.20 | 0.0110 | 0.47 | 0.30 |
| 47 | 0.21 | 0.25 | 0.45 | 0.010 | 0.0015 | 0.028 | 0.0020 | 0.020 | 0.24 | 0.0020 | 0.08 | 0.20 |
| 48 | 0.22 | 0.26 | 0.47 | 0.006 | 0.0017 | 0.026 | 0.0020 | 0.018 | 0.65 | 0.0026 | 0.10 | 0.10 |
| 49 | 0.21 | 0.22 | 0.45 | 0.005 | 0.0016 | 0.028 | 0.0022 | 0.018 | 0.61 | 0.0014 | 0.50 | 0.10 |
| 50 | 0.22 | 0.26 | 0.45 | 0.006 | 0.0009 | 0.022 | 0.0026 | 0.018 | 0.61 | 0.0026 | 1.00 | 0.26 |

Underline means outside the range specified in the present invention.

TABLE 2B

| Steel No. | Chemical composition (mass %), remainder consisting of Fe and impurities | | | | | | Ac3 (° C.) | Ar3 (° C.) | Ms (° C.) | Note |
|---|---|---|---|---|---|---|---|---|---|---|
| | Ni | V | Nb | Ca | Mg | REM | | | | |
| 26 | | | | | | | 862 | 903 | 387 | Invention Steel |
| 27 | | | | | | | 868 | 904 | 391 | Comparative Steel |
| 28 | | | | | | | 827 | 906 | 431 | Invention Steel |
| 29 | | | | | | | 819 | 876 | 410 | Invention Steel |
| 30 | | | | | | | 857 | 906 | 461 | Invention Steel |
| 31 | | | | | | | 848 | 908 | 459 | Comparative Steel |
| 32 | | | | | | | 827 | 870 | 484 | Comparative Steel |
| 33 | | | | | | | 805 | 885 | 376 | Invention Steel |
| 34 | | | | | | | 819 | 895 | 374 | Invention Steel |
| 35 | | | | | | | 867 | 915 | 424 | Invention Steel |
| 36 | | | | | | | 860 | 915 | 398 | Comparative Steel |
| 37 | | | | | | | 850 | 891 | 456 | Comparative Steel |
| 38 | | | | | | | 850 | 892 | 463 | Invention Steel |
| 39 | | | | | | | 843 | 890 | 448 | Invention Steel |
| 40 | | | | | | | 845 | 909 | 437 | Invention Steel |
| 41 | | | | | | | 821 | 881 | 441 | Comparative Steel |
| 42 | | | | | | | 839 | 874 | 471 | Comparative Steel |
| 43 | | | | | | | 829 | 905 | 421 | Invention Steel |
| 44 | | | | | | | 827 | 903 | 417 | Invention Steel |
| 45 | | | | | | | 829 | 906 | 417 | Invention Steel |
| 46 | | | | | | | 829 | 907 | 411 | Comparative Steel |
| 47 | | | | | | | 840 | 866 | 455 | Comparative Steel |
| 48 | | | | | | | 831 | 872 | 441 | Invention Steel |
| 49 | | | | | | | 843 | 912 | 444 | Invention Steel |
| 50 | | | | | | | 859 | 962 | 440 | Invention Steel |

Underline means outside the range specified in the present invention.

TABLE 3A

| Steel No. | Chemical composition (mass%), remainder consisting of Fe and impurities | | | | | | | | | | | |
|---|---|---|---|---|---|---|---|---|---|---|---|---|
| | C | Si | Mn | P | S | sol.Al | N | Ti | Cr | B | Mo | Co |
| 51 | 0.48 | 0.20 | 0.48 | 0.010 | 0.0006 | 0.031 | 0.0025 | 0.019 | 0.40 | 0.0018 | 0.45 | <u>0.05</u> |
| 52 | 0.47 | 0.10 | 0.40 | 0.007 | 0.0005 | 0.024 | 0.0020 | 0.018 | 0.21 | 0.0030 | 0.44 | 0.10 |
| 53 | 0.47 | 0.20 | 0.45 | 0.009 | 0.0006 | 0.028 | 0.0028 | 0.022 | 0.20 | 0.0010 | 0.46 | 2.00 |
| 54 | 0.47 | 0.14 | 0.45 | 0.008 | 0.0010 | 0.022 | 0.0020 | 0.018 | 0.20 | 0.0030 | 0.34 | 4.00 |
| 55 | 0.21 | 0.22 | 0.35 | 0.010 | 0.0006 | 0.020 | 0.0024 | 0.022 | 0.20 | 0.0030 | 0.15 | <u>4.40</u> |
| 56 | 0.35 | 0.22 | 0.43 | 0.007 | 0.0005 | 0.032 | 0.0020 | 0.022 | 0.21 | 0.0030 | 0.42 | 1.00 |
| 57 | 0.34 | 0.22 | 0.44 | 0.008 | 0.0007 | 0.032 | 0.0022 | 0.026 | 0.25 | 0.0022 | 0.43 | 1.00 |
| 58 | 0.34 | 0.23 | 0.40 | 0.009 | 0.0007 | 0.033 | 0.0024 | 0.021 | 0.22 | 0.0017 | 0.45 | 1.10 |
| 59 | 0.33 | 0.22 | 0.42 | 0.010 | 0.0010 | 0.029 | 0.0025 | 0.020 | 0.20 | 0.0029 | 0.43 | 1.10 |
| 60 | 0.34 | 0.24 | 0.42 | 0.008 | 0.0007 | 0.029 | 0.0023 | 0.025 | 0.23 | 0.0022 | 0.41 | 1.00 |
| 61 | 0.34 | 0.25 | 0.43 | 0.010 | 0.0010 | 0.029 | 0.0023 | 0.020 | 0.22 | 0.0021 | 0.42 | 1.00 |
| 62 | 0.35 | 0.22 | 0.40 | 0.009 | 0.0010 | 0.033 | 0.0023 | 0.021 | 0.23 | 0.0025 | 0.43 | 1.10 |
| 63 | 0.34 | 0.22 | 0.43 | 0.008 | 0.0007 | 0.029 | 0.0025 | 0.026 | 0.24 | 0.0029 | 0.42 | 1.15 |
| 64 | 0.34 | 0.21 | 0.44 | 0.008 | 0.0008 | 0.029 | 0.0023 | 0.029 | 0.20 | 0.0026 | 0.40 | 1.05 |

Underline means outside the range specified in the present invention.

TABLE 3B

| Steel No. | Chemical composition (mass %), remainder consisting of Fe and impurities | | | | | | $Ac_3$ (° C.) | $Ar_3$ (° C.) | $Ms$ (° C.) | Note |
|---|---|---|---|---|---|---|---|---|---|---|
| | Ni | V | Nb | Ca | Mg | REM | | | | |
| 51 | | | | | | | 798 | 906 | 349 | Comparative Steel |
| 52 | | | | | | | 794 | 903 | 361 | Invention Steel |
| 53 | | | | | | | 803 | 906 | 387 | Invention Steel |
| 54 | | | | | | | 793 | 893 | 418 | Invention Steel |
| 55 | | | | | | | 843 | 873 | 522 | Comparative Steel |
| 56 | 0.03 | | | | | | 821 | 901 | 416 | Invention Steel |
| 57 | 0.41 | | | | | | 819 | 904 | 412 | Invention Steel |
| 58 | | 0.030 | | | | | 930 | 904 | 421 | Invention Steel |
| 59 | | 0.100 | | | | | 939 | 902 | 422 | Invention Steel |
| 60 | | | 0.050 | | | | 826 | 919 | 420 | Invention Steel |
| 61 | | | 0.090 | | | | 826 | 932 | 420 | Invention Steel |
| 62 | | | | 0.0030 | | | 824 | 902 | 419 | Invention Steel |
| 63 | | | | | 0.0040 | | 825 | 902 | 422 | Invention Steel |
| 64 | | | | | | 0.0030 | 825 | 901 | 421 | Invention Steel |

Underline means outside the range specified in the present invention.

TABLE 4

| Test No. | Steel No. | Plating | Average heating rate (° C./s) | $Ac_3$ (° C.) | Heating temperature (° C.) | Retention time (s) | HS completion temperature (° C.) | Average cooling rate from HS completion to cooling stop temperature (° C./s) | Average cooling rate from cooling stop temperature to 100° C. (° C./s) | Average cooling rate from 150° C. to 100° C. (° C./s) | Annealing | Note |
|---|---|---|---|---|---|---|---|---|---|---|---|---|
| 1 | <u>1</u> | Absent | 5 | 861 | 900 | 120 | 750 | 60 | 8 | 5 | Absent | Comparative Example |
| 2 | 2 | Absent | 4 | 847 | 905 | 120 | 752 | 60 | 8 | 7 | Absent | Invention Example |
| 3 | 3 | Absent | 5 | 795 | 900 | 120 | 746 | 60 | 6 | 5 | Absent | Invention Example |
| 4 | 4 | Absent | 4 | 800 | 900 | 120 | 745 | 20 | 4 | 2 | Present | Invention Example |
| 5 | <u>5</u> | Absent | 4 | 761 | 900 | 120 | 740 | 20 | 5 | 5 | Present | Comparative Example |
| 6 | <u>6</u> | Absent | 5 | 801 | 900 | 120 | 750 | 60 | 8 | 7 | Absent | Comparative Example |
| 7 | 7 | Present | 5 | 821 | 900 | 120 | 755 | 60 | 8 | 7 | Absent | Invention Example |
| 8 | 8 | Absent | 5 | 853 | 900 | 120 | 752 | 60 | 7 | 6 | Absent | Invention Example |
| 9 | 9 | Absent | 5 | 899 | 920 | 120 | 800 | 30 | 7 | 6 | Absent | Invention Example |
| 10 | <u>10</u> | Absent | 5 | 919 | <u>900</u> | 120 | 756 | 60 | 8 | 7 | Absent | Comparative Example |

TABLE 4-continued

| Test No. | Steel No. | Plating | Average heating rate (° C./s) | Ac₃ (° C.) | Heating temperature (° C.) | Retention time (s) | HS completion temperature (° C.) | Average cooling rate from HS completion to cooling stop temperature (° C./s) | Average cooling rate from cooling stop temperature to 100° C. (° C./s) | Average cooling rate from 150° C. to 100° C. (° C./s) | Annealing | Note |
|---|---|---|---|---|---|---|---|---|---|---|---|---|
| 11 | 11 | Absent | 5 | 859 | 900 | 120 | 750 | 60 | 6 | 5 | Absent | Invention Example |
| 12 | 12 | Absent | 5 | 817 | 900 | 120 | 747 | 60 | 7 | 7 | Absent | Invention Example |
| 13 | 13 | Absent | 5 | 800 | 820 | 120 | 681 | 100 | 5 | 5 | Absent | Invention Example |
| 14 | <u>14</u> | Absent | 5 | 808 | 900 | 120 | 749 | 60 | 7 | 7 | Absent | Comparative Example |
| 15 | 15 | Present | 5 | 802 | 900 | 120 | 750 | 60 | 6 | 6 | Absent | Invention Example |
| 16 | 16 | Absent | 5 | 845 | 900 | 120 | 750 | 100 | 8 | 6 | Absent | Invention Example |
| 17 | 17 | Absent | 5 | 888 | 900 | 120 | 754 | 60 | 7 | 7 | Absent | Invention Example |
| 18 | <u>18</u> | Absent | 5 | 879 | 900 | 120 | 753 | 60 | 8 | 7 | Present | Comparative Example |
| 19 | 19 | Absent | 5 | 839 | 900 | 120 | 752 | 60 | 6 | 6 | Absent | Invention Example |
| 20 | 20 | Absent | 5 | 827 | 900 | 120 | 750 | 60 | 7 | 7 | Absent | Invention Example |
| 21 | 21 | Absent | 5 | 840 | 900 | 120 | 755 | 80 | 7 | 6 | Absent | Invention Example |
| 22 | <u>22</u> | Absent | 5 | 822 | 910 | 120 | 751 | 60 | 6 | 6 | Absent | Comparative Example |
| 23 | <u>23</u> | Absent | 5 | 847 | 900 | 120 | 753 | 80 | 8 | 7 | Absent | Comparative Example |
| 24 | 24 | Absent | 5 | 836 | 900 | 120 | 756 | 100 | 8 | 7 | Absent | Invention Example |
| 25 | 25 | Absent | 5 | 870 | 960 | 120 | 815 | 60 | 8 | 7 | Absent | Invention Example |

Underline means outside the range specified in the present invention or outside the manufacturing conditons recommended in the present specification.

TABLE 5

| Test No. | Steel No. | Plating | Average heating rate (° C./s) | Ac₃ (° C.) | Heating temperature (° C.) | Retention time (s) | HS completion temperature (° C.) | Average cooling rate from HS completion to cooling stop temperature (° C./s) | Average cooling rate from cooling stop temperature to 100° C. (° C./s) | Average cooling rate from 150° C. to 100° C. (° C./s) | Annealing | Note |
|---|---|---|---|---|---|---|---|---|---|---|---|---|
| 26 | 26 | Absent | 5 | 862 | 950 | 120 | 810 | 60 | 8 | 7 | Absent | Invention Example |
| 27 | <u>27</u> | Absent | 5 | 868 | 950 | 120 | 813 | 60 | 8 | 7 | Absent | Comparative Example |
| 28 | 28 | Absent | 5 | 827 | 900 | 120 | 752 | 60 | 7 | 7 | Absent | Invention Example |
| 29 | 29 | Absent | 5 | 819 | 900 | 120 | 750 | 60 | 7 | 6 | Absent | Invention Example |
| 30 | 30 | Absent | 5 | 857 | 900 | 120 | 748 | 300 | 8 | 8 | Absent | Invention Example |
| 31 | <u>31</u> | Absent | 5 | 848 | 900 | 120 | 752 | 60 | 7 | 6 | Absent | Comparative Example |
| 32 | <u>32</u> | Absent | 5 | 827 | 900 | 120 | 750 | 60 | 7 | 6 | Absent | Comparative Example |
| 33 | 33 | Absent | 5 | 805 | 900 | 120 | 750 | 60 | 8 | 8 | Absent | Invention Example |
| 34 | 34 | Absent | 5 | 819 | 900 | 120 | 753 | 60 | 7 | 6 | Present | Invention Example |
| 35 | 35 | Absent | 5 | 867 | 900 | 120 | 754 | 60 | 7 | 7 | Absent | Invention Example |
| 36 | <u>36</u> | Absent | 5 | 860 | 900 | 120 | 750 | 60 | 8 | 7 | Absent | Comparative Example |
| 37 | <u>37</u> | Absent | 5 | 850 | 930 | 120 | 765 | 60 | 8 | 7 | Absent | Comparative Example |
| 38 | 38 | Absent | 5 | 850 | 900 | 120 | 757 | 490 | 8 | 7 | Absent | Invention Example |
| 39 | 39 | Absent | 5 | 843 | 900 | 120 | 751 | 60 | 7 | 7 | Absent | Invention Example |
| 40 | 40 | Absent | 5 | 845 | 900 | 120 | 755 | 60 | 9 | 8 | Absent | Invention Example |

TABLE 5-continued

| | | | | | | | Hot stamping conditions | | | | |
|---|---|---|---|---|---|---|---|---|---|---|---|
| Test No. | Steel No. | Plating | Average heating rate (° C./s) | Ac$_3$ (° C.) | Heating temperature (° C.) | Retention time (s) | HS completion temperature (° C.) | Average cooling rate from HS completion to cooling stop temperature (° C./s) | Average cooling rate from cooling stop temperature to 100° C. (° C./s) | Average cooling rate from 150° C. to 100° C. (° C./s) | Annealing | Note |
| 41 | 41 | Present | 5 | 821 | 900 | 120 | 748 | 60 | 7 | 7 | Absent | Comparative Example |
| 42 | 42 | Absent | 5 | 839 | 900 | 120 | 750 | 60 | 5 | 5 | Absent | Comparative Example |
| 43 | 43 | Absent | 5 | 829 | 900 | 120 | 751 | 60 | 7 | 6 | Absent | Invention Example |
| 44 | 44 | Absent | 5 | 827 | 900 | 120 | 752 | 60 | 9 | 9 | Absent | Invention Example |
| 45 | 45 | Absent | 5 | 829 | 900 | 120 | 750 | 60 | 8 | 7 | Absent | Invention Example |
| 46 | 46 | Absent | 5 | 829 | 900 | 120 | 753 | 60 | 8 | 7 | Absent | Comparative Example |
| 47 | 47 | Absent | 5 | 840 | 880 | 120 | 750 | 60 | 7 | 6 | Absent | Comparative Example |
| 48 | 48 | Absent | 5 | 831 | 900 | 120 | 751 | 60 | 6 | 5 | Absent | Invention Example |
| 49 | 49 | Absent | 5 | 843 | 900 | 120 | 749 | 60 | 8 | 7 | Absent | Invention Example |
| 50 | 50 | Absent | 5 | 859 | 900 | 120 | 747 | 60 | 8 | 7 | Absent | Invention Example |

Underline means outside the range specified in the present invention or outside the manufacturing conditons recommended in the present specification.

TABLE 6

| | | | | | | | Hot stamping conditions | | | | |
|---|---|---|---|---|---|---|---|---|---|---|---|
| Test No. | Steel No. | Plating | Average heating rate (° C./s) | Ac$_3$ (° C.) | Heating temperature (° C.) | Retention time (s) | HS completion temperature (° C.) | Average cooling rate from HS completion to cooling stop temperature (° C./s) | Average cooling rate from cooling stop temperature to 100° C. (° C./s) | Average cooling rate from 150° C. to 100° C. (° C./s) | Annealing | Note |
| 51 | 51 | Absent | 5 | 798 | 900 | 120 | 750 | 60 | 8 | 8 | Absent | Comparative Example |
| 52 | 52 | Present | 5 | 794 | 880 | 120 | 735 | 60 | 8 | 6 | Absent | Invention Example |
| 53 | 53 | Absent | 5 | 803 | 900 | 120 | 751 | 60 | 7 | 7 | Absent | Invention Example |
| 54 | 54 | Absent | 5 | 793 | 880 | 120 | 740 | 60 | 8 | 6 | Absent | Invention Example |
| 55 | 55 | Absent | 5 | 843 | 900 | 120 | 749 | 60 | 6 | 6 | Absent | Comparative Example |
| 56 | 56 | Absent | 5 | 821 | 900 | 120 | 750 | 60 | 8 | 7 | Absent | Invention Example |
| 57 | 57 | Absent | 5 | 819 | 900 | 120 | 752 | 60 | 8 | 7 | Absent | Invention Example |
| 58 | 58 | Absent | 5 | 830 | 900 | 120 | 753 | 60 | 8 | 8 | Absent | Invention Example |
| 59 | 59 | Absent | 5 | 839 | 900 | 120 | 753 | 60 | 8 | 7 | Absent | Invention Example |
| 60 | 60 | Absent | 5 | 826 | 900 | 120 | 756 | 60 | 8 | 8 | Absent | Invention Example |
| 61 | 61 | Absent | 5 | 826 | 900 | 120 | 748 | 60 | 7 | 6 | Absent | Invention Example |
| 62 | 62 | Absent | 5 | 824 | 900 | 120 | 749 | 60 | 6 | 6 | Absent | Invention Example |
| 63 | 63 | Absent | 5 | 825 | 900 | 120 | 754 | 60 | 8 | 7 | Absent | Invention Example |
| 64 | 64 | Absent | 5 | 825 | 900 | 120 | 752 | 60 | 7 | 7 | Absent | Invention Example |

TABLE 6-continued

| | | | | | | | Hot stamping conditions | | | | |
|---|---|---|---|---|---|---|---|---|---|---|---|
| Test No. | Steel No. | Plating | Average heating rate (° C./s) | Ac₃ (° C.) | Heating temperature (° C.) | Retention time (s) | HS completion temperature (° C.) | Average cooling rate from HS completion to cooling stop temperature (° C./s) | Average cooling rate from cooling stop temperature to 100° C. (° C./s) | Average cooling rate from 150° C. to 100° C. (° C./s) | Annealing | Note |
| 65 | 60 | Absent | <u>160</u> | 826 | 900 | 120 | 752 | 60 | 6 | 6 | Absent | Comparative Example |
| 66 | 60 | Absent | 5 | 826 | <u>800</u> | 120 | 753 | 60 | 7 | 6 | Absent | Comparative Example |
| 67 | 60 | Absent | 5 | 826 | 900 | 120 | 750 | <u>4</u> | 6 | 5 | Absent | Comparative Example |
| 68 | 60 | Absent | 5 | 826 | 900 | 120 | 748 | <u>600</u> | 6 | 5 | Absent | Comparative Example |
| 69 | 60 | Absent | 5 | 826 | 900 | 120 | 754 | 300 | <u>13</u> | 9 | Absent | Comparative Example |
| 70 | 60 | Absent | 5 | 826 | 900 | 120 | 754 | 300 | 9 | <u>12</u> | Absent | Comparative Example |
| 71 | 34 | Absent | <u>200</u> | 819 | 900 | 120 | 752 | 60 | 8 | 7 | Absent | Comparative Example |
| 72 | 34 | Absent | 5 | 819 | <u>780</u> | 120 | 650 | 80 | 8 | 6 | Absent | Comparative Example |
| 73 | 34 | Absent | 5 | 819 | 900 | 120 | 750 | <u>4</u> | 8 | 7 | Absent | Comparative Example |
| 74 | 34 | Absent | 5 | 819 | 900 | 120 | 752 | <u>550</u> | 8 | 7 | Absent | Comparative Example |
| 75 | 34 | Absent | 5 | 819 | 900 | 120 | 754 | 60 | <u>30</u> | 9 | Absent | Comparative Example |
| 76 | 34 | Absent | 5 | 819 | 900 | 120 | 753 | 60 | 9 | <u>13</u> | Absent | Comparative Example |

Underline means outside the range specified in the present invention or outside the manufacturing conditons recommended in the present specification.

TABLE 7

| | | Hot-stamping formed body | | | | | | | | | |
|---|---|---|---|---|---|---|---|---|---|---|---|
| | | Microstructure | | | | | | Mechanical properties | | | |
| Test No. | Steel No. | Martensite (area %) | Others (area %) | Total (area %) | Region in which average GAIQ value in unit gram is 60,000 or more (area %) | Average particle size of carbides (μm) | Number density of carbides of 0.20 μm or more (mm²) | Partially softened region | Tensile strength TS (MPa) | Maximum bending angle α (deg) | TS × α (MPa · deg) | Note |
| <u>1</u> | <u>1</u> | 95 | 5 | 100 | 85 | 0.11 | 8 | Absent | <u>1411</u> | 82 | 115702 | Comparative Example |
| 2 | 2 | 97 | 3 | 100 | 33 | 0.10 | 10 | Absent | 1508 | 75 | 113100 | Invention Example |
| 3 | 3 | 100 | 0 | 100 | 41 | 0.08 | 21 | Absent | 2486 | 49 | 121814 | Invention Example |
| 4 | 4 | 100 | 0 | 100 | 35 | 0.18 | 37 | Present | 3325 | 27 | 89775 | Invention Example |
| <u>5</u> | <u>5</u> | 100 | 0 | 100 | 30 | 0.35 | <u>74</u> | Present | 3543 | 15 | <u>53145</u> | Comparative Example |
| <u>6</u> | <u>6</u> | 100 | 0 | 100 | 64 | 0.23 | <u>52</u> | Absent | 2064 | 35 | <u>72240</u> | Comparative Example |
| 7 | 7 | 98 | 2 | 100 | 70 | 0.13 | 18 | Absent | 1854 | 65 | 120510 | Invention Example |
| 8 | 8 | 100 | 0 | 100 | 67 | 0.06 | 6 | Absent | 2078 | 60 | 124680 | Invention Example |
| 9 | 9 | 100 | 0 | 100 | 68 | 0.05 | 3 | Absent | 1903 | 58 | 110374 | Invention Example |
| <u>10</u> | <u>10</u> | <u>88</u> | 12 | 100 | 65 | 0.07 | 7 | Absent | 1744 | 34 | <u>59296</u> | Comparative Example |
| 11 | 11 | 93 | 7 | 100 | 86 | 0.13 | 15 | Absent | 1644 | 74 | 121656 | Invention Example |
| 12 | 12 | 99 | 1 | 100 | 58 | 0.07 | 20 | Absent | 2233 | 59 | 131747 | Invention Example |
| 13 | 13 | 96 | 4 | 100 | 62 | 0.12 | 13 | Absent | 2281 | 58 | 132298 | Invention Example |
| <u>14</u> | <u>14</u> | 100 | 0 | 100 | 60 | 0.10 | 35 | Absent | 1822 | 41 | <u>74702</u> | Comparative Example |
| 15 | 15 | 100 | 0 | 100 | 43 | 0.12 | 26 | Absent | 2474 | 51 | 126174 | Invention Example |
| 16 | 16 | 98 | 2 | 100 | 60 | 0.12 | 10 | Absent | 2065 | 63 | 130095 | Invention Example |
| 17 | 17 | 99 | 1 | 100 | 65 | 0.10 | 8 | Absent | 2042 | 57 | 116394 | Invention Example |
| <u>18</u> | <u>18</u> | 100 | 0 | 100 | 38 | 0.16 | 18 | Present | 2502 | 26 | <u>65052</u> | Comparative Example |
| 19 | 19 | 100 | 0 | 100 | 73 | 0.10 | 10 | Absent | 1824 | 70 | 127680 | Invention Example |
| 20 | 20 | 100 | 0 | 100 | 64 | 0.12 | 16 | Absent | 2093 | 57 | 119301 | Invention Example |
| 21 | 21 | 95 | 5 | 100 | 82 | 0.14 | 18 | Absent | 1657 | 63 | 104391 | Invention Example |

TABLE 7-continued

| | | Hot-stamping formed body | | | | | | | | | |
|---|---|---|---|---|---|---|---|---|---|---|---|
| | | Microstructure | | | | | | Mechanical properties | | | |
| Test No. | Steel No. | Martensite (area %) | Others (area %) | Total (area %) | Region in which average GAIQ value in unit gram is 60,000 or more (area %) | Average particle size of carbides (μm) | Number density of carbides of 0.20 μm or more (mm$^2$) | Partially softened region | Tensile strength TS (MPa) | Maximum bending angle α (deg) | TS × α (MPa · deg) | Note |
| 22 | 22 | 100 | 0 | 100 | 67 | 0.08 | 7 | Absent | 2035 | 35 | 71225 | Comparative Example |
| 23 | 23 | 96 | 4 | 100 | 80 | 0.07 | 7 | Absent | 1522 | 46 | 70012 | Comparative Example |
| 24 | 24 | 97 | 3 | 100 | 78 | 0.13 | 15 | Absent | 1674 | 64 | 107136 | Invention Example |
| 25 | 25 | 98 | 2 | 100 | 84 | 0.12 | 13 | Absent | 1502 | 77 | 115654 | Invention Example |

Underline means outside the range, specified in the present invention or that the required perfomance is not satisfied.

TABLE 8

| | | Hot-stamping formed body | | | | | | | | | |
|---|---|---|---|---|---|---|---|---|---|---|---|
| | | Microstructure | | | | | | Mechanical properties | | | |
| Test No. | Steel No. | Martensite (area %) | Others (area %) | Total (area %) | Region in which average GAIQ value in unit gram is 60,000 or more (area %) | Average particle size of carbides (μm) | Number density of carbides of 0.20 μm or more (mm$^2$) | Partially softened region | Tensile strength TS (MPa) | Maximum bending angle α (deg) | TS × α (MPa · deg) | Note |
| 26 | 26 | 100 | 0 | 100 | 46 | 0.10 | 11 | Absent | 2433 | 53 | 128949 | Invention Example |
| 27 | 27 | 100 | 0 | 100 | 48 | 0.10 | 13 | Absent | 2200 | 33 | 72600 | Comparative Example |
| 28 | 28 | 100 | 0 | 100 | 71 | 0.09 | 15 | Absent | 1846 | 65 | 119990 | Invention Example |
| 29 | 29 | 96 | 4 | 100 | 66 | 0.11 | 23 | Absent | 2088 | 58 | 121104 | Invention Example |
| 30 | 30 | 99 | 1 | 100 | 78 | 0.07 | 8 | Absent | 1534 | 69 | 105846 | Invention Example |
| 31 | 31 | 97 | 3 | 100 | 80 | 0.09 | 12 | Absent | 1518 | 49 | 74382 | Comparative Example |
| 32 | 32 | 87 | 13 | 100 | 88 | 0.18 | 18 | Absent | 1467 | 49 | 71883 | Comparative Example |
| 33 | 33 | 100 | 0 | 100 | 44 | 0.10 | 19 | Present | 2423 | 56 | 135688 | Invention Example |
| 34 | 34 | 100 | 0 | 100 | 45 | 0.11 | 23 | Absent | 2408 | 50 | 120400 | Invention Example |
| 35 | 35 | 99 | 1 | 100 | 70 | 0.10 | 8 | Absent | 1855 | 62 | 115010 | Invention Example |
| 36 | 36 | 100 | 0 | 100 | 59 | 0.09 | 18 | Absent | 2227 | 31 | 69037 | Comparative Example |
| 37 | 37 | 98 | 2 | 100 | 78 | 0.41 | 83 | Absent | 1531 | 47 | 71957 | Comparative Example |
| 38 | 38 | 100 | 0 | 100 | 63 | 0.19 | 37 | Absent | 1548 | 68 | 105264 | Invention Example |
| 39 | 39 | 98 | 2 | 100 | 76 | 0.08 | 7 | Absent | 1542 | 72 | 111024 | Invention Example |
| 40 | 40 | 100 | 0 | 100 | 72 | 0.07 | 10 | Absent | 1691 | 60 | 101460 | Invention Example |
| 41 | 41 | 96 | 4 | 100 | 73 | 0.38 | 61 | Absent | 1501 | 46 | 69046 | Comparative Example |
| 42 | 42 | 87 | 13 | 100 | 85 | 0.12 | 13 | Absent | 1470 | 49 | 72030 | Comparative Example |
| 43 | 43 | 97 | 3 | 100 | 69 | 0.11 | 16 | Absent | 2058 | 61 | 125538 | Invention Example |
| 44 | 44 | 99 | 1 | 100 | 67 | 0.12 | 13 | Absent | 2076 | 58 | 120408 | Invention Example |
| 45 | 45 | 100 | 0 | 100 | 68 | 0.13 | 20 | Absent | 2068 | 57 | 117876 | Invention Example |
| 46 | 46 | 100 | 0 | 100 | 66 | 0 15 | 31 | Absent | 2081 | 35 | 72835 | Comparative Example |
| 47 | 47 | 85 | 15 | 100 | 78 | 0.13 | 15 | Absent | 1457 | 50 | 72850 | Comparative Example |
| 48 | 48 | 97 | 3 | 100 | 77 | 0.09 | 8 | Absent | 1515 | 67 | 101505 | Invention Example |
| 49 | 49 | 100 | 0 | 100 | 78 | 0.10 | 10 | Absent | 1523 | 68 | 103564 | Invention Example |
| 50 | 50 | 100 | 0 | 100 | 75 | 0.12 | 12 | Absent | 1531 | 68 | 104108 | Invention Example |

Underline means outside the range, specified in the present invention or that the required perfomance is not satisfied.

TABLE 9

| | | Hot-stamping formed body | | | | | | | | | |
|---|---|---|---|---|---|---|---|---|---|---|---|
| | | Microstructure | | | | | | Mechanical properties | | | |
| Test No. | Steel No. | Martensite (area %) | Others (area %) | Total (area %) | Region in which average GAIQ value in unit gram is 60,000 or more (area %) | Average particle size of carbides (μm) | Number density of carbides of 0.20 μm or more (mm$^2$) | Partially softened region | Tensile strength TS (MPa) | Maximum bending angle α (deg) | TS × α (MPa · deg) | Note |
|---|---|---|---|---|---|---|---|---|---|---|---|---|
| <u>51</u> | 51 | 100 | 0 | 100 | <u>27</u> | 0.14 | 20 | Present | 2548 | 25 | <u>63700</u> | Comparative Example |
| 52 | 52 | 100 | 0 | 100 | 36 | 0.13 | 30 | Absent | 2531 | 54 | 136674 | Invention Example |
| 53 | 53 | 100 | 0 | 100 | 44 | 0.15 | 37 | Absent | 2508 | 58 | 145464 | Invention Example |
| 54 | 54 | 100 | 0 | 100 | 50 | 0.15 | 40 | Absent | 2496 | 60 | 149760 | Invention Example |
| <u>55</u> | 55 | <u>89</u> | 11 | 100 | 89 | 0.13 | 15 | Absent | <u>1467</u> | 80 | 117360 | Comparative Example |
| 56 | 56 | 100 | 0 | 100 | 69 | 0.11 | 13 | Absent | 2063 | 64 | 132032 | Invention Example |
| 57 | 57 | 100 | 0 | 100 | 67 | 0.10 | 10 | Absent | 2037 | 61 | 124257 | Invention Example |
| 58 | 58 | 100 | 0 | 100 | 66 | 0.09 | 7 | Absent | 2051 | 64 | 131264 | Invention Example |
| 59 | 59 | 100 | 0 | 100 | 68 | 0.12 | 14 | Absent | 1997 | 67 | 133799 | Invention Example |
| 60 | 60 | 100 | 0 | 100 | 65 | 0.09 | 11 | Absent | 2068 | 63 | 130284 | Invention Example |
| 61 | 61 | 100 | 0 | 100 | 67 | 0.10 | 13 | Absent | 2059 | 60 | 123540 | Invention Example |
| 62 | 62 | 100 | 0 | 100 | 70 | 0.12 | 18 | Absent | 2053 | 64 | 131392 | Invention Example |
| 63 | 63 | 100 | 0 | 100 | 67 | 0.12 | 15 | Absent | 2044 | 60 | 122640 | Invention Example |
| 64 | 64 | 100 | 0 | 100 | 69 | 0.12 | 20 | Absent | 2037 | 63 | 128331 | Invention Example |
| <u>65</u> | 60 | 99 | 1 | 100 | 69 | 0.40 | <u>63</u> | Absent | 2083 | 36 | <u>74988</u> | Comparative Example |
| <u>66</u> | 60 | <u>85</u> | 15 | 100 | 68 | 0.25 | <u>58</u> | Absent | 1924 | 35 | <u>67340</u> | Comparative Example |
| 67 | 60 | <u>8</u> | 92 | 100 | 95 | 0.38 | <u>223</u> | Absent | <u>820</u> | 100 | 82000 | Comparative Example |
| <u>68</u> | 60 | 100 | 0 | 100 | <u>29</u> | 0.04 | 2 | Absent | 2287 | 31 | <u>70897</u> | Comparative Example |
| <u>69</u> | 60 | 100 | 0 | 100 | <u>28</u> | 0.07 | 5 | Absent | 2124 | 35 | <u>74340</u> | Comparative Example |
| <u>70</u> | 60 | 100 | 0 | 100 | <u>29</u> | 0.07 | 6 | Absent | 2115 | 33 | <u>69795</u> | Comparative Example |
| <u>71</u> | 34 | 100 | 0 | 100 | 46 | 0.30 | <u>72</u> | Absent | 2431 | 30 | <u>72930</u> | Comparative Example |
| <u>72</u> | 34 | <u>89</u> | 14 | 100 | 50 | 0.36 | <u>84</u> | Absent | 2030 | 35 | <u>71050</u> | Comparative Example |
| <u>73</u> | 34 | <u>9</u> | 91 | 100 | 85 | 0.45 | <u>451</u> | Absent | <u>1062</u> | 95 | 100890 | Comparative Example |
| <u>74</u> | 34 | 100 | 0 | 100 | <u>15</u> | 0.08 | 15 | Absent | 2531 | 15 | <u>37965</u> | Comparative Example |
| <u>75</u> | 34 | 100 | 0 | 100 | <u>25</u> | 0.10 | 16 | Absent | 2188 | 30 | <u>71640</u> | Comparative Example |
| <u>76</u> | 34 | 100 | 0 | 100 | <u>29</u> | 0.10 | 17 | Absent | 2365 | 31 | <u>73315</u> | Comparative Example |

Underline means outside the range, specified in the present invention or that the required perfomance is not satisfied.

As shown in Tables 1A to 9, the invention examples satisfying the chemical composition and microstructure specified in the present invention were excellent in mechanical properties (tensile strength and bendability). The comparative examples that did not satisfy the chemical composition and microstructure specified in the present invention were inferior in mechanical properties.

As shown in FIG. 2, it can be seen that in Test No. 52 which is an invention example, there were many regions (black regions) having a low dislocation density, and in Test No. 74 which is a comparative example, there were many regions (white regions) having a high dislocation density.

INDUSTRIAL APPLICABILITY

According to the above aspect according to the present invention, it is possible to provide a hot-stamping formed body having high strength and excellent bendability.

The invention claimed is:

1. A hot-stamping formed body comprising, as a chemical composition, by mass %:
C: 0.20% or more and less than 0.70%;
Si: 0.010% to 1.30%;
Mn: less than 0.50%;
P: 0.100% or less;
S: 0.0100% or less;
sol. Al: 0.0010% to 0.500%;
N: 0.0100% or less;
Ti: 0.010% to 0.100%;
Cr: 0.010% to 0.80%;
B: 0.0005% to 0.0100%;
Mo: 0.10% to 1.00%;
Co: 0.10% to 4.00%;
Nb: 0% to 0.100%;
V: 0% to 0.100%;
Ni: 0% to 0.50%;
REM: 0% to 0.0100%;
Mg: 0% to 0.0100%;
Ca: 0% to 0.0100%; and
a remainder consisting of Fe and impurities,
wherein a microstructure of the hot-stamping formed body includes, by area ratio, 90% to 100% of martensite and 0% to 10% of a crystalline phase other than the martensite,
in the microstructure,
a region in which an average grain average image quality value in a unit grain is 60,000 or more is 30 area % or more, and
a number density of carbides having a circle equivalent diameter of 0.20 μm or more is 50/mm$^2$ or less.

2. The hot-stamping formed body according to claim 1 comprising, as the chemical composition, by mass %, one or two or more elements of:

Nb: 0.010% to 0.100%;
V: 0.001% to 0.100%;
Ni: 0.001% to 0.50%;
REM: 0.0010% to 0.0100%;
Mg: 0.0010% to 0.0100%; and
Ca: 0.0010% to 0.0100%.

3. The hot-stamping formed body according to claim 2, further comprising:
a plating layer on a surface layer of the hot-stamping formed body.

4. The hot-stamping formed body according to claim 2, wherein a portion of the hot-stamping formed body has a softened region.

5. The hot-stamping formed body according to claim 1, further comprising:
a plating layer on a surface layer of the hot-stamping formed body.

6. The hot-stamping formed body according to claim 5, wherein a portion of the hot-stamping formed body has a softened region.

7. The hot-stamping formed body according to claim 1, wherein a portion of the hot-stamping formed body has a softened region.

8. A hot-stamping formed body comprising, as a chemical composition, by mass %:
C: 0.20% or more and less than 0.70%;
Si: 0.010% to 1.30%;
Mn: less than 0.50%;
P: 0.100% or less;
S: 0.0100% or less;
sol. Al: 0.0010% to 0.500%;
N: 0.0100% or less;
Ti: 0.010% to 0.100%;
Cr: 0.010% to 0.80%;
B: 0.0005% to 0.0100%;
Mo: 0.10% to 1.00%;
Co: 0.10% to 4.00%;
Nb: 0% to 0.100%;
V: 0% to 0.100%;
Ni: 0% to 0.50%;
REM: 0% to 0.0100%;
Mg: 0% to 0.0100%;
Ca: 0% to 0.0100%; and
a remainder comprising Fe and impurities,
wherein a microstructure of the hot-stamping formed body includes, by area ratio, 90% to 100% of martensite and 0% to 10% of a crystalline phase other than the martensite,
in the microstructure,
a region in which an average grain average image quality value in a unit grain is 60,000 or more is 30 area % or more, and
a number density of carbides having a circle equivalent diameter of 0.20 μm or more is 50/mm$^2$ or less.

* * * * *